US008533070B2

(12) United States Patent
Tischer et al.

(10) Patent No.: US 8,533,070 B2
(45) Date of Patent: Sep. 10, 2013

(54) APPARATUS AND METHOD FOR AGGREGATING AND ACCESSING DATA ACCORDING TO USER INFORMATION

(75) Inventors: Steven Tischer, Atlanta, GA (US); Samuel N. Zellner, Dunwoody, GA (US); Robert J. Starr, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 12/909,145

(22) Filed: Oct. 21, 2010
(Under 37 CFR 1.47)

(65) Prior Publication Data
US 2011/0093390 A1 Apr. 21, 2011

Related U.S. Application Data

(63) Continuation of application No. 11/323,186, filed on Dec. 30, 2005, now abandoned, which is a continuation-in-part of application No. 10/195,197, filed on Jul. 15, 2002, now Pat. No. 7,194,083.

(51) Int. Cl.
*G06Q 30/00* (2012.01)
(52) U.S. Cl.
USPC ............... 705/27.1; 705/64; 705/67; 705/35; 705/42; 705/44; 455/406; 455/410; 455/411; 455/414.1; 713/155; 726/17; 726/21; 726/27; 726/28
(58) Field of Classification Search
USPC ............. 370/466; 455/410, 411, 414.1, 406; 705/26, 34, 44, 64, 67; 713/155, 167–182; 726/2–10, 16–21, 26
See application file for complete search history.

(56) References Cited

U.S. PATENT DOCUMENTS

| 4,218,590 | A | 8/1980 | Rasmussen et al. |
| 4,691,338 | A | 9/1987 | Makino |
| 4,706,274 | A | 11/1987 | Baker et al. |
| 5,222,123 | A | 6/1993 | Brown et al. |
| 5,257,406 | A | 10/1993 | Ito et al. |
| 5,475,734 | A | 12/1995 | McDonald et al. |
| 5,479,480 | A | 12/1995 | Scott |
| 5,497,412 | A | 3/1996 | Lannen et al. |
| 5,564,072 | A | 10/1996 | Garcia Aguilera et al. |

(Continued)

OTHER PUBLICATIONS

U.S. Final Official Action dated Oct. 27, 2010 in U.S. Appl. No. 11/733,525.

(Continued)

*Primary Examiner* — Allahyar Kasraian
(74) *Attorney, Agent, or Firm* — Hartman & Citrin LLC

(57) ABSTRACT

An apparatus and method for aggregating and accessing data according to user information are provided. According to one aspect, an interface device for providing data between a first device and a second device comprises an input, an output, logic, and a repository for storing personal data and data associated with one or more users. The input of the interface device receives data in a first format from the first device. The logic receives a data request, identifies a second device for receiving the data, identifies a second format for the second device, and translates the data to the second format. The translated data is then transmitted to the second device via the output. The logic may further collect, aggregate, and transmit the aggregated data to a requesting device. The input may be a product identification input device. The second device may be billed for the data services.

7 Claims, 18 Drawing Sheets

(56) References Cited

U.S. PATENT DOCUMENTS

| | | | |
|---|---|---|---|
| 5,610,910 | A | 3/1997 | Focsaneanu et al. |
| 5,666,487 | A | 9/1997 | Goodman et al. |
| 5,675,629 | A | 10/1997 | Raffel et al. |
| 5,757,902 | A | 5/1998 | Mitsuo |
| 5,758,281 | A | 5/1998 | Emery et al. |
| 5,790,631 | A | 8/1998 | Minarczik et al. |
| 5,826,193 | A | 10/1998 | Ghisler et al. |
| 5,898,679 | A | 4/1999 | Brederveld et al. |
| 5,901,359 | A | 5/1999 | Malmstrom |
| 5,911,120 | A | 6/1999 | Jarett et al. |
| 5,920,815 | A | 7/1999 | Akhavan |
| 5,926,760 | A | 7/1999 | Khan et al. |
| 5,970,388 | A | 10/1999 | Will |
| 5,978,469 | A | 11/1999 | Benson |
| 5,982,762 | A | 11/1999 | Anzai et al. |
| 5,982,854 | A | 11/1999 | Ehreth |
| 5,987,678 | A | 11/1999 | Ayers |
| 6,073,031 | A | 6/2000 | Helstab et al. |
| 6,138,026 | A | 10/2000 | Irvin |
| 6,167,278 | A | 12/2000 | Nilssen |
| 6,208,627 | B1 | 3/2001 | Menon et al. |
| 6,222,919 | B1 | 4/2001 | Hollatz et al. |
| 6,259,925 | B1 | 7/2001 | Josse |
| 6,297,646 | B1 | 10/2001 | Lang et al. |
| 6,301,474 | B1 | 10/2001 | Hartmaier et al. |
| 6,362,778 | B2 | 3/2002 | Neher |
| 6,470,028 | B1 | 10/2002 | Perry et al. |
| 6,643,709 | B1 | 11/2003 | Kwon |
| 6,792,095 | B1 | 9/2004 | Frank |
| 6,920,144 | B2 | 7/2005 | Niermann |
| 6,947,738 | B2 | 9/2005 | Skog et al. |
| 6,950,674 | B2 | 9/2005 | Jarrett |
| 6,961,575 | B2 | 11/2005 | Stanforth |
| 6,978,141 | B2 | 12/2005 | Smith et al. |
| 7,003,287 | B2 | 2/2006 | Roeder |
| 7,035,633 | B2 | 4/2006 | Kirkpatrick |
| 7,120,426 | B2 | 10/2006 | Link, II et al. |
| 7,130,616 | B2 | 10/2006 | Janik |
| 7,136,358 | B2 | 11/2006 | Kunito et al. |
| 7,203,199 | B1 | 4/2007 | Duree et al. |
| 7,315,553 | B2 | 1/2008 | Keller-Tuberg et al. |
| 7,392,035 | B2 * | 6/2008 | Rahman et al. ............ 455/406 |
| 7,418,492 | B1 | 8/2008 | Cohen et al. |
| 7,437,148 | B1 | 10/2008 | Vaghi |
| 7,437,330 | B1 * | 10/2008 | Robinson et al. ............ 705/67 |
| 8,046,007 | B2 | 10/2011 | Frank et al. |
| 2002/0021669 | A1 | 2/2002 | Kunito et al. |
| 2002/0045453 | A1 | 4/2002 | Juttner et al. |
| 2002/0073416 | A1 * | 6/2002 | Ramsey Catan ............ 725/6 |
| 2002/0089998 | A1 | 7/2002 | Le |
| 2002/0099663 | A1 * | 7/2002 | Yoshino et al. ............ 705/65 |
| 2002/0108121 | A1 | 8/2002 | Alao et al. |
| 2002/0137498 | A1 | 9/2002 | Goss et al. |
| 2003/0005135 | A1 * | 1/2003 | Inoue et al. ............ 709/229 |
| 2003/0050062 | A1 | 3/2003 | Chen et al. |
| 2003/0067314 | A1 | 4/2003 | Kaukko |
| 2003/0138050 | A1 | 7/2003 | Yamada et al. |
| 2003/0187920 | A1 | 10/2003 | Redkar |
| 2003/0214775 | A1 | 11/2003 | Fukuta et al. |
| 2004/0095316 | A1 * | 5/2004 | Shibamiya et al. ............ 345/156 |
| 2004/0131040 | A1 | 7/2004 | Gruhl et al. |
| 2004/0203705 | A1 | 10/2004 | Lundby |
| 2004/0208119 | A1 | 10/2004 | Christodoulou et al. |
| 2004/0232770 | A1 | 11/2004 | Gisy et al. |
| 2005/0044229 | A1 | 2/2005 | Brown et al. |
| 2005/0238148 | A1 | 10/2005 | Poustchi et al. |
| 2005/0240467 | A1 * | 10/2005 | Eckart et al. ............ 705/10 |
| 2005/0271080 | A1 | 12/2005 | Gorman |
| 2006/0064750 | A1 | 3/2006 | Kersey et al. |
| 2006/0121916 | A1 | 6/2006 | Aborn et al. |
| 2007/0017976 | A1 * | 1/2007 | Peyret et al. ............ 235/380 |
| 2007/0088818 | A1 | 4/2007 | Roberts et al. |
| 2007/0094279 | A1 | 4/2007 | Mittal et al. |
| 2007/0206592 | A1 | 9/2007 | Itakura et al. |
| 2008/0020734 | A1 * | 1/2008 | Smith et al. ............ 455/411 |
| 2008/0096528 | A1 | 4/2008 | DePani et al. |
| 2008/0228600 | A1 * | 9/2008 | Treyz et al. ............ 705/27 |
| 2008/0317063 | A1 | 12/2008 | Enzmann et al. |
| 2011/0026436 | A1 | 2/2011 | Karaoguz et al. |
| 2012/0021739 | A1 | 1/2012 | Frank et al. |

OTHER PUBLICATIONS

U.S. Final Official Action dated Mar. 2, 2011 in U.S. Appl. No. 12/759,767.
U.S. Notice of Allowance dated Mar. 8, 2011 in U.S. Appl. No. 12/639,313.
U.S. Notice of Allowance dated Dec. 27, 2010 in U.S. Appl. No. 11/637,264.
U.S. Official Action dated Feb. 7, 2011 in U.S. Appl. No. 11/952,510.
U.S. Final Official Action dated Feb. 4, 2011 in U.S. Appl. No. 12/639,448.
U.S. Final Official Action dated Mar. 11, 2011 in U.S. Appl. No. 12/640,073.
U.S. Notice of Allowance dated Apr. 14, 2011 in U.S. Appl. No. 12/639,313.
U.S. Notice of Allowance dated Apr. 15, 2011 in U.S. Appl. No. 11/637,264.
U.S. Notice of Allowance dated Mar. 29, 2011 in U.S. Appl. No. 12/837,785.
U.S. Official Action dated Mar. 21, 2011 in U.S. Appl. No. 12/642,288.
U.S. Official Action dated Apr. 13, 2011 in U.S. Appl. No. 12/874,450.
U.S. Official Action dated Jan. 19, 2011 in U.S. Appl. No. 11/324,034.
Notice of Allowance/Allowability dated Dec. 23, 2010, in U.S. Appl. No. 12/837,785.
U.S. Office Action dated Sep. 14, 2011 in U.S. Appl. No. 11/952,510.
U.S. Notice of Allowance dated Oct. 13, 2011 in U.S. Appl. No. 12/639,448.
U.S. Notice of Allowance dated Nov. 14, 2011 in U.S. Appl. No. 12/642,288.
U.S. Notice of Allowance dated May 17, 2011 in U.S. Appl. No. 12/639,448.
U.S. Official Action dated Jun. 17, 2011 in U.S. Appl. No. 12/642,288.
U.S. Office Action dated May 4, 2012 in U.S. Appl. No. 13/089,577.
U.S. Office Action dated Jan. 30, 2012 in U.S. Appl. No. 11/952,510.
U.S. Office Action dated May 22, 2012 in U.S. Appl. No. 12/874,450.
U.S. Official Action dated Jun. 26, 2012 in U.S. Appl. No. 12/759,767.
U.S. Official Action dated Feb. 16, 2012 in U.S. Appl. No. 13/249,977.
U.S. Notice of Allowance dated Aug. 16, 2012 in U.S. Appl. No. 13/089,577.
U.S. Office Action dated Dec. 5, 2012 in U.S. Appl. No. 11/952,510.
U.S. Notice of Allowance dated Nov. 16, 2012 in U.S. Appl. No. 12/759,767.
U.S. Office Action dated Oct. 11, 2012 in U.S. Appl. No. 12/854,475.
U.S. Office Action dated Nov. 14, 2012 in U.S. Appl. No. 12/874,450.

* cited by examiner

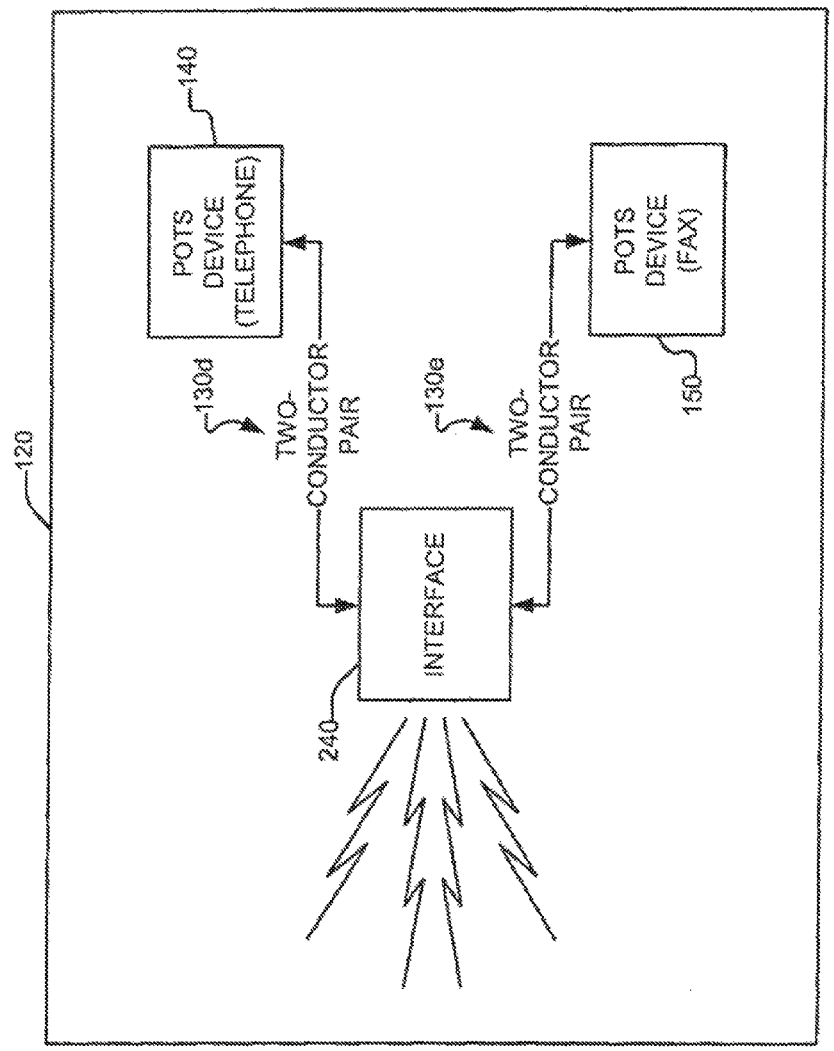
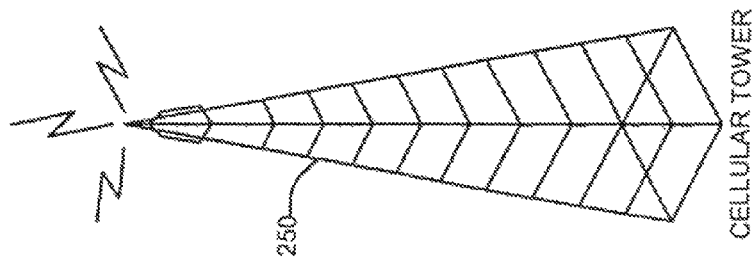
FIG. 2

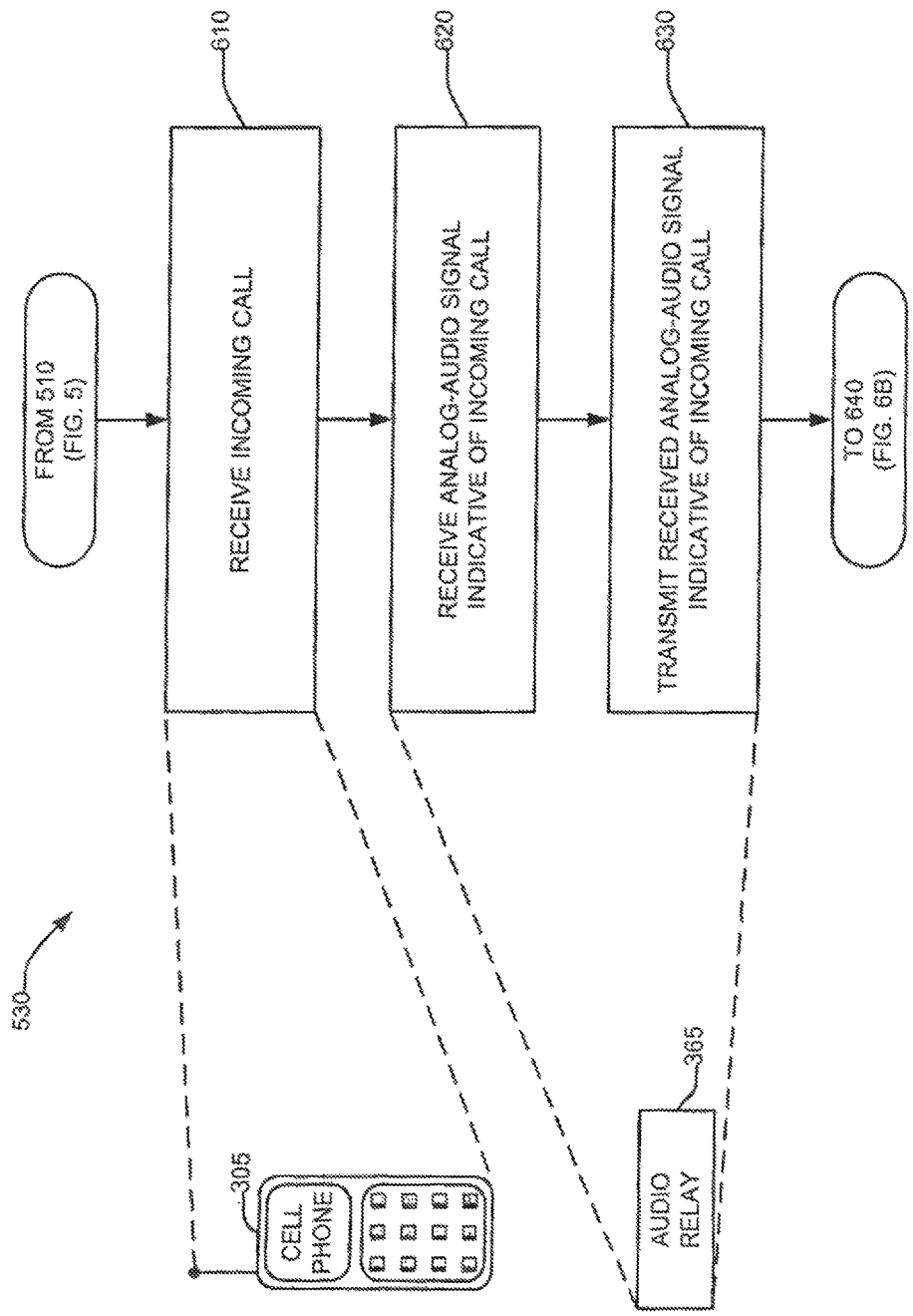

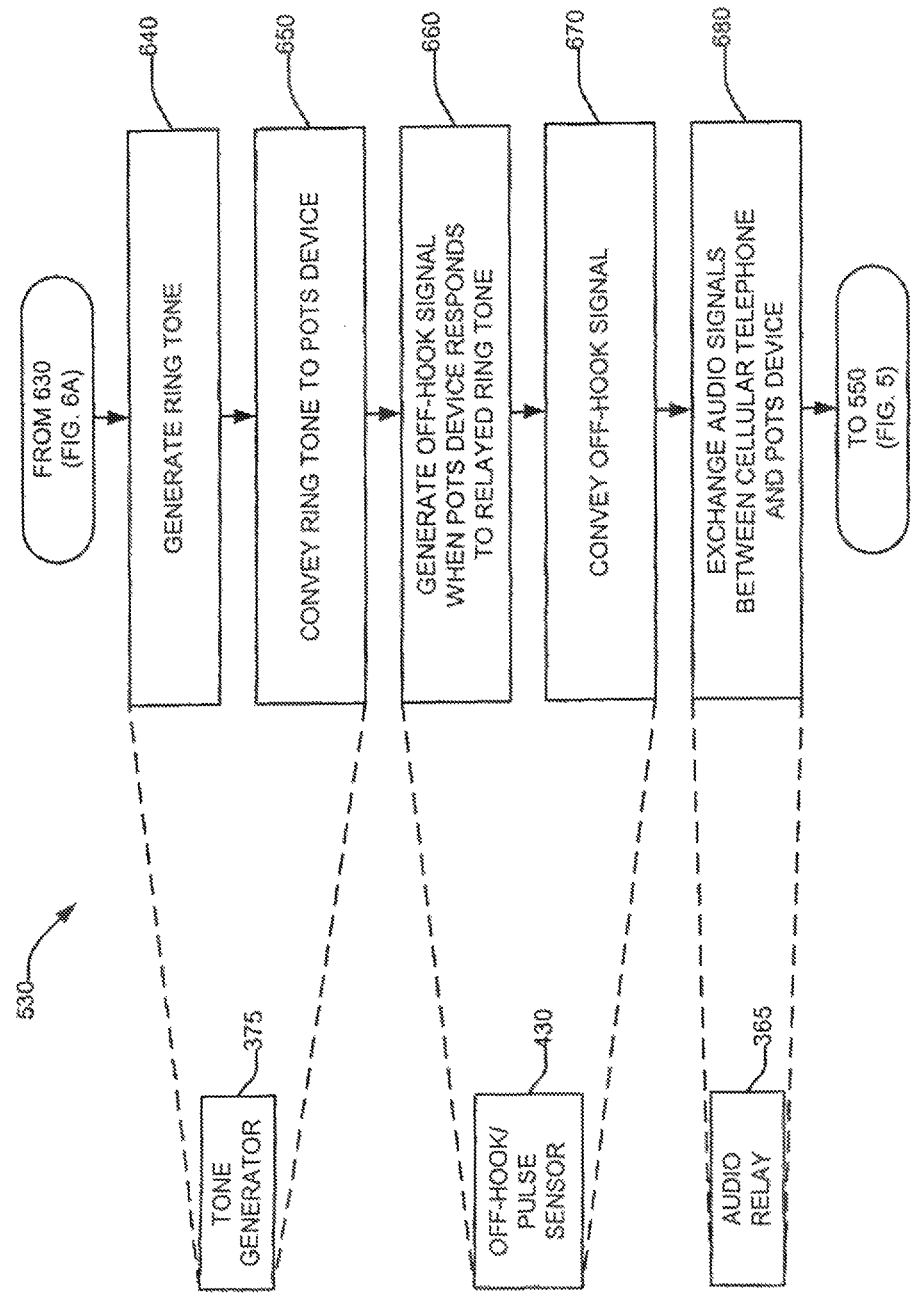

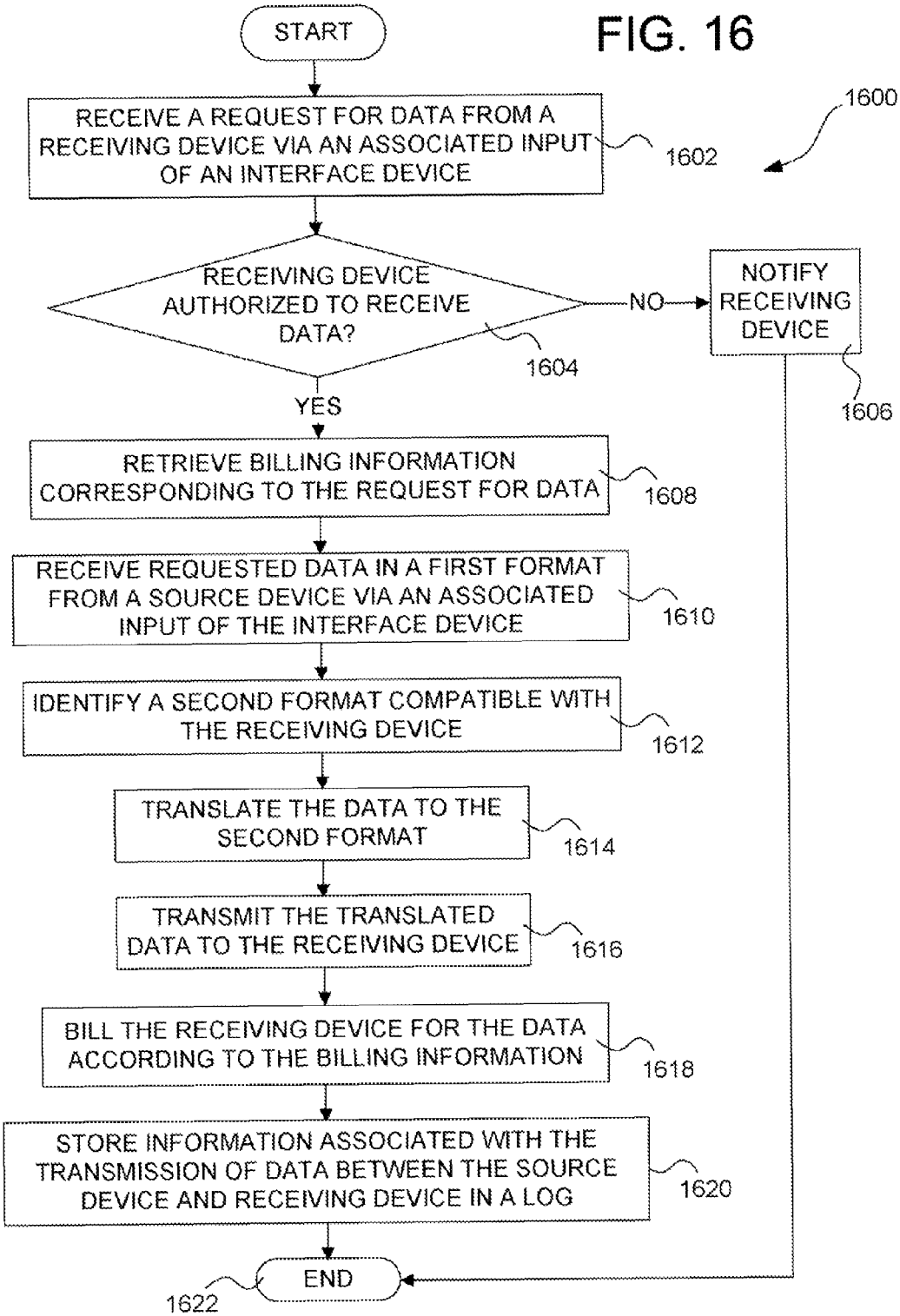

APPARATUS AND METHOD FOR AGGREGATING AND ACCESSING DATA ACCORDING TO USER INFORMATION

CROSS-REFERENCE TO RELATED APPLICATIONS

This patent application is a Continuation of U.S. patent application Ser. No. 11/323,186, entitled "Apparatus and Method for Aggregating and Accessing Data According to User Information," filed Dec. 30, 2005, now abandoned, which is a Continuation-In-Part of U.S. patent application No. 10/195,197, now U.S. Pat. No. 7,194,083, entitled "System and Method for Interfacing Plain Old Telephone System (POTS) Devices with Cellular Networks," filed on Jul. 15, 2002. Each of the U.S. patent applications listed in this section is herein incorporated by reference in its entirety.

This patent application is related to the following U.S. patents and U.S. patent applications: U.S. Pat. No. 7,623,654, entitled "Systems and Methods for Interfacing Telephony Devices with Cellular and Computer Networks," filed on Aug. 30, 2004; U.S. Pat. No. 7,522,722, entitled "System and Method for Interfacing Plain Old Telephone System (POTS) Devices with Cellular Devices in Communication with a Cellular Network," filed on Aug. 30, 2004; U.S. Pat. No. 7,200,424, entitled "Systems and Methods for Restricting the Use and Movement of Telephony Devices," filed on Aug. 30, 2004; U.S. Pat. No. 7,623,653, entitled "Systems and Methods for Passing Through Alternative Network Device Features to Plain Old Telephone System (POTS) Devices," filed on Aug. 30, 2004; U.S. Pat. No. 7,363,034, entitled "Cellular Docking Station," filed on Dec. 30, 2005; U.S. patent application Ser. No. 11/323,180, entitled "Apparatus, Method, and Computer-Readable Medium for Interfacing Communications Devices," filed on Dec. 30, 2005, now abandoned; U.S. patent application Ser. No. 11/323,820, entitled "Apparatus, Method, and Computer-Readable Medium for Interfacing Devices with Communications Networks," filed on Dec. 30, 2005, now abandoned; U.S. patent application Ser. No. 11/323,825, entitled "Apparatus and Method for Providing a User Interface for Facilitating Communications Between Devices," filed on Dec. 30, 2005, now abandoned; U.S. patent application Ser. No. 11/323,181, entitled "Apparatus, Method, and Computer-Readable Medium for Securely Providing Communications Between Devices and Networks," filed on Dec. 30, 2005, now abandoned; U.S. patent application Ser. No. 11/324,034, entitled "Interface Devices for Facilitating Communications Between Devices and Communications Networks," filed on Dec. 30, 2005, now abandoned; U.S. patent application Ser. No. 11/323,182, entitled "Apparatus and Method for Providing Communications and Connection-Oriented Services to Devices," filed on Dec. 30, 2005, now abandoned; U.S. patent application Ser. No. 11/323,185, entitled "Apparatus and Method for Prioritizing Communications Between Devices," filed on Dec. 30, 2005, now abandoned; U.S. patent application Ser. No. 11/324,149, entitled "Apparatus, Method, and Computer-Readable Medium for Communication Between and Controlling Network Devices," filed on Dec. 30, 2005, now abandonded; U.S. patent application Ser. No. 11/324,033, entitled "Apparatus and Method for Restricting Access to Data," filed on Dec. 30, 2005, now abandoned; U.S. patent application Ser. No. 11/323,818, entitled "Apparatus and Method for Providing Emergency and Alarm Communications," filed on Dec. 30, 2005; and U.S. patent application Ser. No. 11/324,154, entitled "Apparatus and Method for Testing Communication Capabilities of Networks and Devices," filed on Dec. 30, 2005, now abandoned. Each of the U.S. patent applications listed in this section is herein incorporated by reference in its entirety.

TECHNICAL FIELD

The exemplary embodiments relate generally to telecommunications and, more particularly, to an apparatus and method for aggregating and accessing data according to user information.

BACKGROUND

Emerging communications network protocols and solutions, such as Voice over Internet Protocol (VoIP) and WI-FI, allow individuals to use VoIP and WI-FI compatible devices to communicate with each other over wide area networks, such as the Internet, in the same manner in which they currently communicate over the Public Switched Telecommunications Network (PSTN). However, in most instances, owners of legacy devices such as cellular telephones and Plain Old Telephone System (POTS) devices which are compatible with cellular networks and the PSTN are not capable of interfacing these devices to networks associated with the emerging communications network protocol and solutions. Thus, legacy device owners are inconvenienced by having multiple devices that lack functionality with the emerging communications network protocols and solutions. Owners of legacy devices cannot convert data sent via the emerging communications network protocols and solutions to formats compatible with the legacy devices. Moreover, legacy devices cannot collect, store, and aggregate various types of data, or provide a secure central repository for personal data.

SUMMARY

In accordance with exemplary embodiments, the above and other problems are solved by providing an apparatus and method for aggregating and accessing data according to user information. According to one aspect, an interface device provides data between a first device and a second device. The interface device has an input for receiving data in a first format from at least the first device. The interface device has a repository for storing the data. Logic within the interface device is configured to receive a request for accessing the data stored in the repository and identify the second device for receiving the data. The logic identifies a second format that is compatible with the second device and translates the data to the second format. The interface device further has an output for transmitting the translated data to the second device. The logic may be further configured for aggregating data stored within the repository for transmission to a requesting device. The input may be a product identification input device such as a Radio Frequency Identity (RFID) proximity reader or an optical bar code reader. Additionally, the data received by the interface device may be financial information associated with a user. A security agent is operative to restrict access to the financial data.

According to a further aspect, an interface device provides data between a first device and a second device. The interface device has a repository for storing personal data associated with at least one user. The interface device has an input for receiving the personal data in a first format from the first device. Logic within the interface device is configured for receiving a request for accessing the personal data and identifying the second device for receiving the personal data. The logic identifies a second format that is compatible with the second device and translates the data to the second format. The logic is further configured for determining whether the second device is authorized to receive the personal data prior to transmitting the translated personal data to the second device. This authorization may be based on the identity of the second device or the identity of a user associated with the second device. The interface device has an output for transmitting the translated data to the second device if the second device is authorized to receive the personal data.

According to yet another aspect, a method provides for exchanging data between a first device and a second device. The method includes receiving a request for the data from the second device via a second input of an interface device. Billing information corresponding to the request for the data from the second device is received at the interface device. The first input of the interface device receives the requested data in a first format from the first device. A second format that is compatible with the second device is identified. The data is translated to the second format and transmitted to the second device. The second device is then billed for the data according to the billing information. The billing information may comprise a billing amount based on the characteristics of the data requested or based on a subscription associated with the second device.

The above-described aspects may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize exemplary embodiments, will be apparent from a reading of the following detailed description and a review of the associated drawings.

BRIEF DESCRIPTION OF THE DRAWINGS

Many exemplary embodiments can be better understood with reference to the following drawings. The components in the drawings are not necessarily to scale, emphasis instead being placed upon clearly illustrating the principles of the exemplary embodiments. Moreover, in the drawings, like reference numerals designate corresponding parts throughout the several views.

FIG. 2 is a block diagram showing one illustrative embodiment of the system for interfacing POTS devices with cellular networks;

FIGS. 6A and 6B are flowcharts showing one illustrative embodiment of the method associated with the conversion of cellular network compatible signals to POTS compatible signals;

FIG. 16 is a flowchart showing an illustrative embodiment of the method for exchanging data between communications devices and billing for the data.

DETAILED DESCRIPTION

Reference will now be made in detail to the description. While several illustrative embodiments will be described in connection with these drawings, there is no intent to limit it to the illustrative embodiment or illustrative embodiments disclosed therein. On the contrary, the intent is to cover all alternatives, modifications, and equivalents included within the spirit and scope of the embodiments as defined by the claims.

Figure 1:
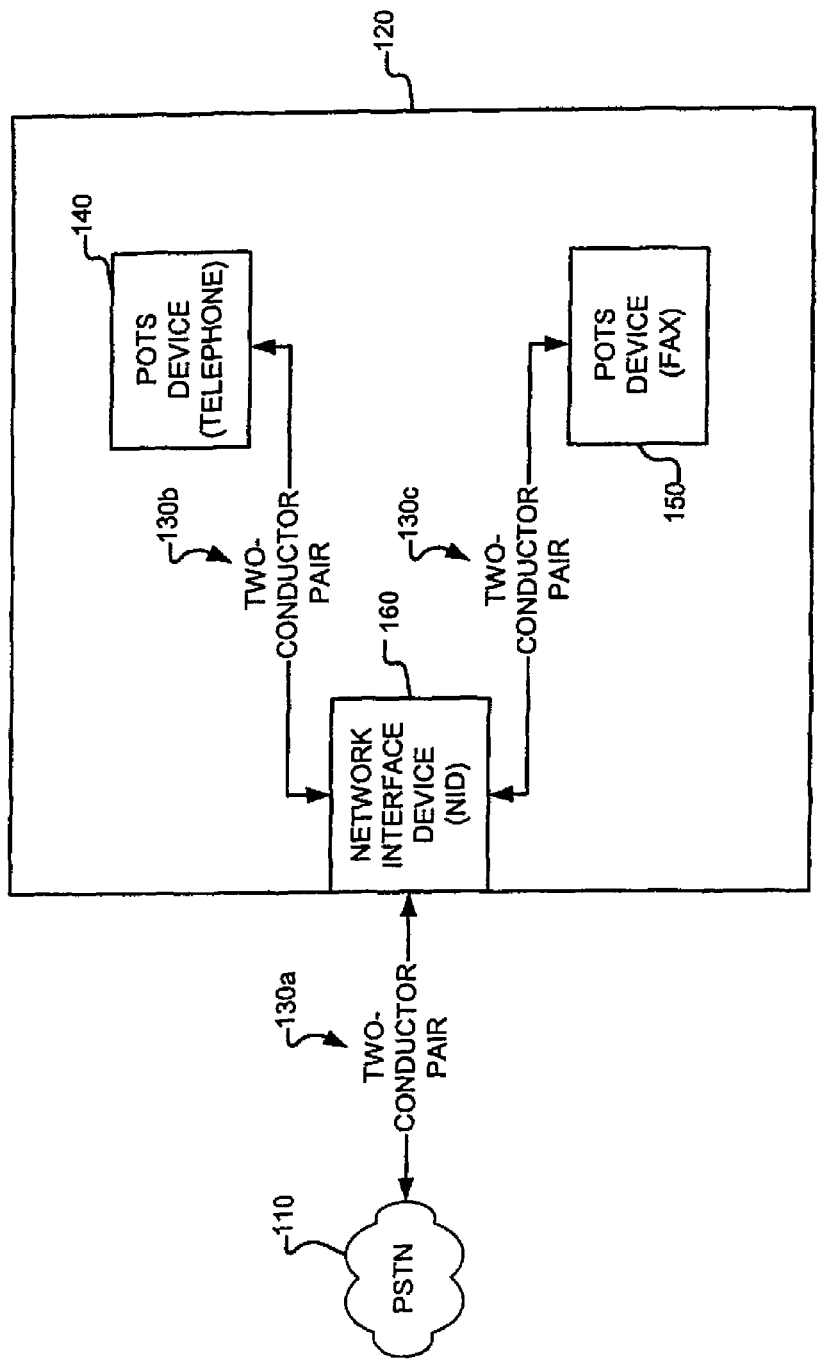
FIG. 1 is a block diagram showing a conventional POTS connection to a telephone company through a network interface device.

FIG. 1 is a block diagram showing a conventional POTS connection to a PSTN 110 through a Network Interface Device (NID) 160. As such connections are well understood by those skilled in the art, only a cursory discussion is presented here. As shown in FIG. 1, several POTS devices 140, 150 occupy a location 120 (e.g., home, business, etc.). Each POTS device 140, 150 is connected to the NID 160 by two-conductor pair wires 130b, 130c, also known as POTS pairs, or twisted pairs. The NID 160 serves as the interface between the POTS devices 140, 150 and the PSTN 110, wherein the NID 160 is connected to the PSTN 110 through at least a two-conductor pair 130a or landline 130a. As evident from FIG. 1, if the landline 130a is severed, or if the landline 130a is unavailable due to geographical limitations, then the POTS devices 140, 150 within the location 120 have no connection to the PSTN 110.

FIG. 2 is a block diagram showing one illustrative embodiment of a system for interfacing POTS devices 140, 150 with cellular networks. As shown in FIG. 2, one or more POTS devices 140, 150 occupy a location 120. However, unlike FIG. 1, the POTS devices 140, 150 in FIG. 2 are configured to communicate with at least one cellular tower 250 through an interface device 240, thereby permitting connection between the POTS devices 140, 150 and a cellular network. In this sense, the POTS devices 140, 150 are connected to the interface device 240, rather than an NID 160 (FIG. 1), by two-conductor pair wires 130d, 130e. Since the interface device 240 is a bridge between the POTS devices 140, 150 and the cellular network, the interface device 240 is configured to receive POTS compatible signals from the POTS devices 140, 150 and convert the POTS compatible signals to cellular network compatible signals, which are transmitted from the interface device 240 to the cellular tower 250. Additionally, the interface device 240 is configured to receive cellular network compatible signals from the cellular tower 250 and convert the cellular network compatible signals to POTS compatible signals, which are then forwarded to the POTS devices 140, 150 for use within the location 120. While a specific PSTN network is not shown in FIG. 2, it will be clear to one of ordinary skill in the art that the cellular tower 250 may be connected to a PSTN network, thereby permitting communication with other PSTN devices.

Figure 3:
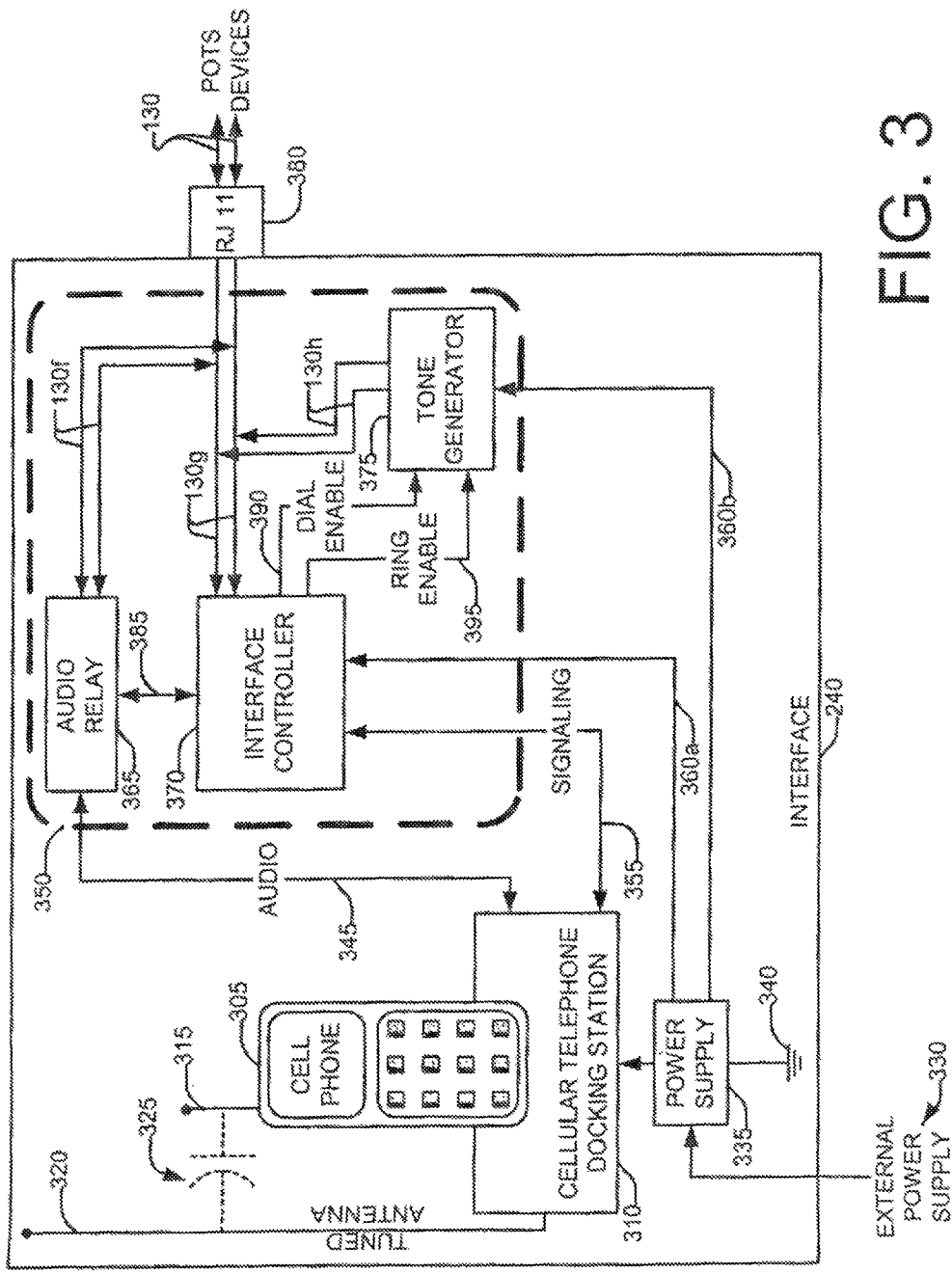
FIG. 3 is a block diagram showing one illustrative embodiment of the interface of FIG. 2.

FIG. 3 is a block diagram showing, in greater detail, a preferred illustrative embodiment of the interface device 240 of FIG. 2. In the preferred illustrative embodiment, the cellular network compatible signals are transmitted and received at the interface device 240 by a cellular telephone 305 while the POTS compatible signals are transmitted and received at the interface device 240 through a POTS connector 380, such as an RJ11 connector 380. Thus, in the preferred illustrative embodiment, the interface device 240 comprises a cellular phone docking station 310 that is configured to interface with the cellular telephone 305, thereby establishing a communications link with the cellular telephone 305. The cellular phone docking station 310 may also have a tuned antenna 320 that is configured to improve transmission and reception by the cellular telephone 305, thereby providing a more robust connection to the cellular network through the cellular tower 250 (FIG. 2). The tuned antenna 320 may be coupled to a cellular telephone antenna 315 in a non-destructive, non-contact, or capacitative manner, for example, using capacitative coupling 325, as shown in FIG. 3. In addition to interfacing with a cellular telephone 305 through one of a variety of conventional connectors (not shown), the cellular phone docking station 310 is configured to receive signaling data through signaling line 355, which may include commands associated with outgoing telephone calls. Thus, in one illustrative embodiment, the signaling data on signaling line 355 may be indicative of a telephone number.

The received signaling data on signaling line 355 is conveyed to the cellular telephone 305 by the cellular phone docking station 310, thereby permitting control over certain operations of the cellular telephone 305 using the signaling data on signaling line 355. In conveying the signaling data on signaling line 355, the cellular phone docking station 310 may modify the signaling data on signaling line 355 appropriately (e.g., amplify, attenuate, reformat, etc.), or, alternatively, the cellular phone docking station 310 may relay the signaling data on signaling line 355 without modification. Regardless of whether or not the signaling data on signaling line 355 is modified, several aspects of the conveyed signal are discussed below, in greater detail, with reference to other components 350 associated with the interface device 240. Although the term line is used to describe various non-limiting embodiments, one skilled in the art will be aware that in some embodiments a line carrying signals may be a path on a separate communication media from other signals while the line carrying signals in other embodiments may be a path on a communications media into which many different signals are multiplexed using various multiplexing techniques understood to one of ordinary skill in the art. Furthermore, in other embodiments, the signals may be carried by wireless communication media.

In addition to the cellular phone docking station 310, the interface device 240 comprises an interface controller 370, an audio relay 365, a tone generator 375, and a power supply 335. The audio relay 365 is configured to exchange analog-audio signals 345 between the POTS devices 140, 150 (FIG. 2) and the cellular phone docking station 310. In this sense, for incoming analog-audio signals 345 (i.e., audio from the cellular telephone 305 to the POTS devices 140, 150 (FIG. 2), the audio relay 365 receives analog-audio signals 345 from the cellular phone docking station 310 and transmits the analog-audio signals 345 to the POTS devices 140, 150 (FIG. 2) through the POTS connector (e.g., RJ11 connector) 380. Similarly, for outgoing analog-audio signals 345 (i.e., audio from the POTS devices 140, 150 (FIG. 2) to the cellular telephone 305), the analog audio signals 345 are received by the audio relay 365 through the POTS connector 380 and transmitted to the cellular phone docking station 310. Thus, the audio relay 365 provides a bi-directional communication link for the analog-audio signals 345 between the POTS devices 140, 150 (FIG. 2) and the cellular phone docking station 310. In a preferred illustrative embodiment, the audio relay 365 is also configured to either amplify or attenuate the analog-audio signals 345 in response to audio-control signals 385 generated by the interface controller 370. Thus, the behavior of the audio relay 365 is governed by the interface controller 370, which is discussed in greater detail below.

The tone generator 375 is configured to generate certain tones that are used by the POTS devices 140, 150 (FIG. 2). For example, when there is an incoming telephone call, the POTS devices 140, 150 (FIG. 2) "ring" to indicate the presence of the incoming telephone call. The tone generator 375, in such instances, is configured to generate a ring tone, which is then transmitted to the POTS devices 140, 150 (FIG. 2) through the POTS connector 380. The transmitted ring tone indicates to the POTS devices 140, 150 (FIG. 2) that they should "ring," thereby notifying the user of the incoming telephone call. The ring tone is generated in response to a ring enable signal on ring enable line 395, which is discussed below with reference to the interface controller 370.

In another example, when a user picks up a POTS telephone 140 (FIG. 2), a dial-tone is produced at the POTS telephone 140 (FIG. 2). The tone generator 375 is configured to generate the dial tone and transmit the generated dial tone to the POTS telephone 140 (FIG. 2). The dial tone is generated in response to a dial enable signal on dial enable line 390, which is also discussed below with reference to the interface controller 370.

The power supply 335 is configured to provide the components of the interface device 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, and any other device in the interface device 240 that may be powered by a DC source.

The interface controller 370 is configured to control the behavior of the audio relay 365, the tone generator 375, and the cellular phone docking station 310 during the conversion of POTS compatible signals to cellular network compatible signals, and vice versa. Thus, when an outgoing telephone call is placed by one of the POTS devices 140, 150 (FIG. 2), the interface controller 370 receives the dialed numbers and converts the dialed numbers to a digital command. The digital command is transmitted as signaling data on signaling line 355 from the interface controller 370 to the cellular phone docking station 310, which, in turn, transmits the signaling data on signaling line 355 to the cellular telephone 305. The signaling data 355, therefore, instructs the cellular telephone 305 to dial the number. In one illustrative embodiment, when the number has been dialed and the called party picks up the phone, the cellular telephone 305 detects the connection and conveys an analog-audio signal 345 to the audio relay 365. In this illustrative embodiment, the audio relay 365 subsequently indicates to the interface controller 370 that the call is connected, and the interface controller 370 generates an audio-control signal 385, thereby enabling bi-directional audio communication of analog-audio signals 345 (i.e., talking between the connected parties) through the audio relay 365. If the party on the POTS telephone 140 (FIG. 2) disconnects (i.e., hangs up the phone), then the disconnect is detected by the interface controller 370 through the POTS connector 380. In this illustrative embodiment, the interface controller 370 generates another audio-control signal 385 in response to the disconnect, thereby disabling the audio relay 365 and terminating the bi-directional audio communication between the POTS telephone 140 (FIG. 2) and the cellular telephone 305. The interface controller 370 further generates, in response to the disconnect, signaling data on signaling line 355, which instructs the cellular telephone 305 to stop transmission and reception. If, on the other hand, the cellular telephone 305 disconnects, then this is detected by the audio relay 365 in one illustrative embodiment. The audio relay 365, in turn, transmits the disconnect information to the interface controller 370, and the interface controller 370 subsequently generates the audio-control signal 385 to disable the audio relay 365.

In another illustrative embodiment, information relating to the connected call is transmitted to the interface controller 370 as signaling data on signaling line 355, rather than as an analog-audio signal 345. In this illustrative embodiment, the cellular telephone 305 generates signaling data on signaling line 355 when the connection is established. The signaling data on signaling line 355 is received by the interface controller 370, which generates an audio-control signal 385 in response to the received signaling data on signaling line 355. The audio-control signal 385 enables the audio relay 365, thereby permitting bi-directional audio communication between the POTS telephone 140 (FIG. 2) and the cellular telephone 305. If the party on the POTS telephone 140 (FIG. 2) disconnects (i.e., hangs up the phone), then the disconnect is detected by the interface controller 370 through the POTS connector 380. The interface controller 370 subsequently generates an audio-control signal 385 to disable the audio relay 365, thereby terminating the bi-directional audio communication between the POTS telephone 140 (FIG. 2) and the cellular telephone 305. If, however, the cellular telephone 305 disconnects, then the cellular telephone 305, in this illustrative embodiment, generates signaling data on signaling line 355 indicative of the disconnected call. The generated signaling data on signaling line 355 is transmitted to the interface controller 370, which subsequently generates an audio-control signal 385 to disable the audio relay 365.

In the case of an incoming telephone call, the cellular telephone 305 detects the incoming telephone call and conveys this information to the interface controller 370. In one illustrative embodiment, the information is conveyed to the interface controller 370 through the audio relay 365. Thus, in this illustrative embodiment, the incoming telephone call generates an analog-audio signal 345 at the cellular telephone 305. The analog-audio signal 345 is transmitted from the cellular telephone 305 to the audio relay 365 through the cellular phone docking station 310, and the audio relay 365 then indicates to the interface controller 370 that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The ring tone makes the POTS devices 140, 150 (FIG. 2) "ring." When one of the POTS device 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

In another illustrative embodiment, the information is conveyed to the interface controller 370 through signaling data on signaling line 355. Thus, in this illustrative embodiment, when the cellular telephone 305 detects an incoming telephone call, it generates signaling data on signaling line 355. The signaling data on signaling line 355 is transmitted to the interface controller 370, thereby indicating that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The tone makes the POTS devices 140, 150 (FIG. 2) "ring." When one of the POTS devices 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

Figure 4:
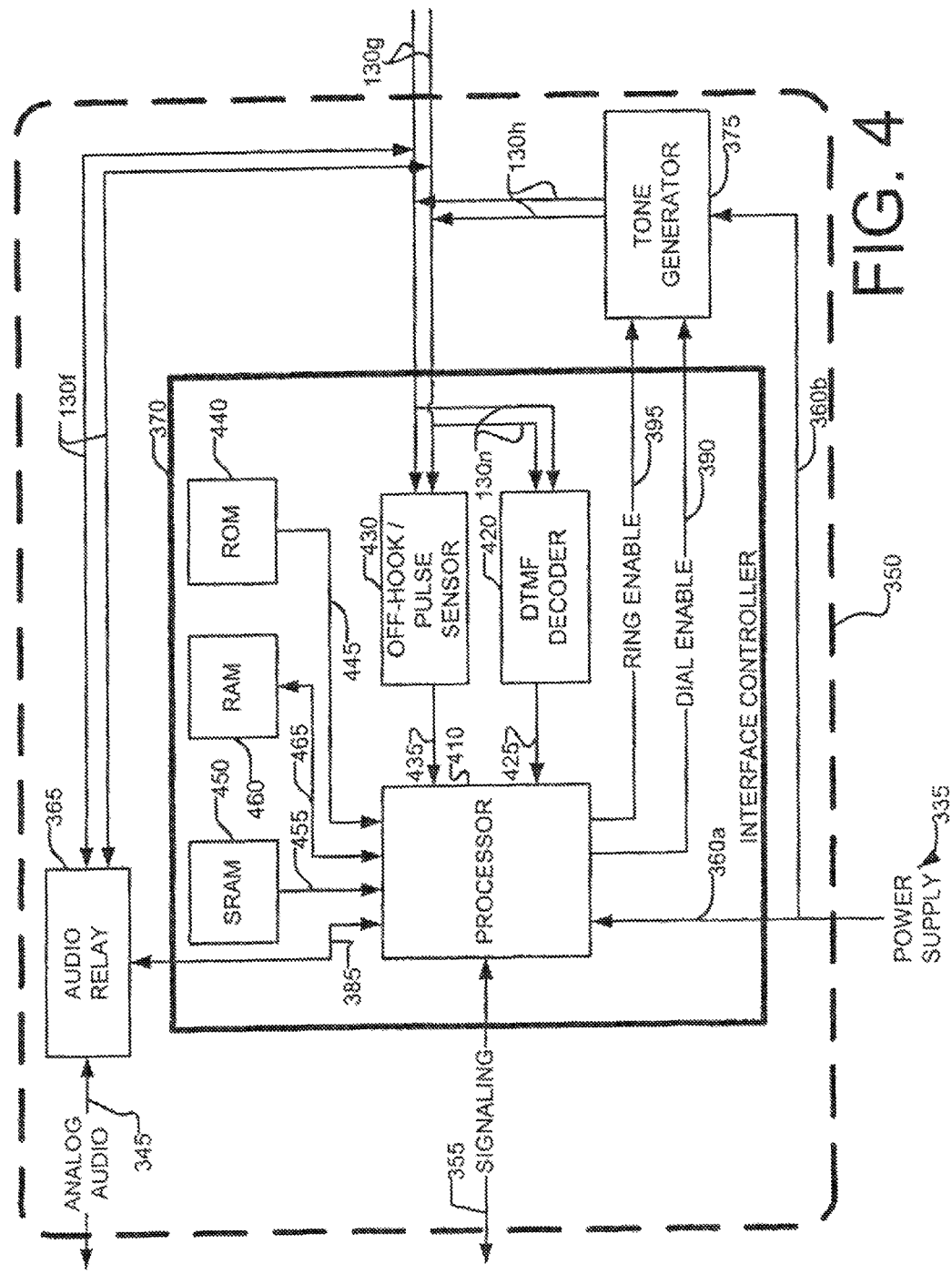
FIG. 4 is a block diagram showing one illustrative embodiment of the hardware within the interface of FIG. 3.

FIG. 4 is a block diagram showing the interface controller 370 of FIG. 3 in greater detail. The interface controller 370 is shown in FIG. 4 as comprising a processor 410, random-access memory (RAM) 460, read-only memory (ROM) 440, Static-Random-Access Memory (SRAM) 450, an off-hook/pulse sensor 430, and a Dual-Tone Multi-Frequency (DTMF) decoder 420. The ROM 440 is configured to store the instructions that run the interface controller 370. In this sense, the ROM 440 is configured to store the program that controls the behavior of the interface controller 370, thereby allowing the interface controller 370 to convert POTS compatible signals to cellular network compatible signals, and vice versa. The SRAM 450 is adapted to store configuration information, such as whether the system is amenable to 10-digit dialing or 7-digit dialing, international calling protocols, etc. Thus, the SRAM 450 may be adapted differently for systems that are used in different geographical areas, or systems that use different calling protocols. The RAM 460 is configured to store temporary data during the running of the program by the processor 410. The processor is configured to control the operation of the off-hook/pulse sensor 430, the DTMF decoder 420, the tone generator 375, and the audio relay 365 in accordance with the instructions stored in ROM 440. Additionally, the processor 410 is configured to generate signaling data on signaling line 355, which may instruct the cellular telephone 305 (FIG. 3) to dial a number, disconnect a call, etc. Several of these functions are discussed in detail below with reference to the off-hook/pulse sensor 430 and the DTMF decoder 420.

The off-hook/pulse sensor 430 is configured to detect when any of the POTS devices 140, 150 (FIG. 2) are off-hook and generate an off-hook signal 435 when a POTS device 140, 150 (FIG. 2) is detected as being off-hook. In this sense, the off-hook/pulse sensor 430 is connected to the POTS connector 380 (FIG. 3) through the two-conductor pair wires 130g.

Thus, when any of the POTS devices 140, 150 (FIG. 2) connected to the two-conductor pair 130 go off-hook, the off-hook is detected by the off-hook/pulse sensor 430, which is also connected to the two-conductor pair 130. The off-hook/pulse sensor 430 generates an off-hook signal 435 after detecting that a POTS device 140, 150 (FIG. 2) is off-hook, and subsequently transmits the off-hook signal 435 to the processor 410. If the POTS device 140, 150 (FIG. 2) is receiving an incoming call, then the off-hook signal 435 indicates that the POTS device 140, 150 (FIG. 2) has "picked up" the incoming call, thereby alerting the processor 410 that the processor 410 should establish a bi-directional audio connection between the cellular telephone 305 (FIG. 3) and the POTS device 140, 150 (FIG. 2). If, on the other hand, the POTS device 140, 150 (FIG. 2) is placing an outgoing call, then the off-hook signal 435 alerts the processor 410 that a phone number will soon follow. In either event, the off-hook/pulse sensor 430 transmits the off-hook signal 435 to the processor 410, which, in turn, generates signaling data on signaling line 355 indicative of the POTS device 140, 150 (FIG. 2) being off-hook. The signaling data on signaling line 355 is then conveyed, either with or without modification, to the cellular telephone 305 through the cellular phone docking station 310.

The off-hook/pulse sensor 430 is further configured to detect dialing from POTS devices 140, 150 (FIG. 2) that are configured for pulse dialing. Since pulse dialing emulates rapid sequential off-hook signals, the off-hook/pulse sensor 430 receives pulses (i.e., the rapid sequential off-hook signals) and produces a sequence of off-hook signals 435 or pulse-dialing signals. The sequence of off-hook signals 435 is relayed to the processor 410, which converts the sequence of off-hook signals into signaling data on signaling line 355 that is indicative of the dialed number. The signaling data on signaling line 355 is transmitted from the processor 410 to the cellular telephone 305 through the cellular phone docking station 310. The cellular telephone 305, after receiving the signaling data on signaling line 355, dials the number indicated by the signaling data on signaling line 355, thereby permitting phone calls by the POTS devices 140, 150 (FIG. 2) through the cellular network. In one illustrative embodiment, the numbers dialed by the POTS devices 140, 150 (FIG. 2) are stored in RAM 460, and, once a predetermined number of dialed numbers has been stored, the processor 410 conveys the stored numbers and a "send" command to the cellular telephone. In other words, upon receiving enough digits to dial a telephone number, as indicated by the configuration information in SRAM 450, the processor 410 commands the cellular telephone 305 to dial the outgoing number, thereby connecting a call from the POTS device 140, 150 (FIG. 2) through the cellular network. In another illustrative embodiment, the RAM stores numbers as they are dialed by the POTS devices 140, 150 (FIG. 2). If, during dialing, the processor 410 detects a delay or a pause, then the processor 410 presumes that all of the digits of the telephone number have been dialed. Thus, the processor 410 commands the cellular telephone 305 to dial the outgoing number, thereby connecting the call from the POTS device 140, 150 (FIG. 2) through the cellular network.

The DTMF decoder 420 is configured to detect dialing from POTS devices 140, 150 (FIG. 2) that are configured for DTMF or "tone" dialing. The DTMF decoder 420 receives a tone, which represents a number, through the two-conductor pair 130n. After receiving the tone, the DTMF decoder 420 generates a DTMF-dialing signal 425 that is indicative of the number that was dialed. The DTMF-dialing signal 425 is then transmitted to the processor 410, which converts the DTMF-dialing signal 425 into signaling data on signaling line 355 that is indicative of the number that was dialed. The signaling data on signaling line 355 is transmitted from the processor 410 to the cellular telephone 305 through the cellular phone docking station 310. The cellular telephone 305 subsequently dials the number indicated by the signaling data on signaling line 355, thereby allowing the POTS device 140, 150 (FIG. 2) to make a call using the cellular network.

It can be seen, from FIGS. 2 through 4, that the various illustrative embodiments of the system will permit the interfacing of POTS devices 140, 150 (FIG. 2) with a cellular network. Specifically, in one illustrative embodiment, POTS devices 140, 150 (FIG. 2) are interfaced with the cellular network through a cellular telephone 305 (FIG. 3), which is attached to the interface device 240 at a cellular phone docking station 310. In addition to the various systems, as described above, another illustrative embodiment may be seen as a method for interfacing POTS devices 140, 150 (FIG. 2) with cellular networks. Several illustrative embodiments of the method are described with reference to FIGS. 5 through 12 below.

Figure 5:
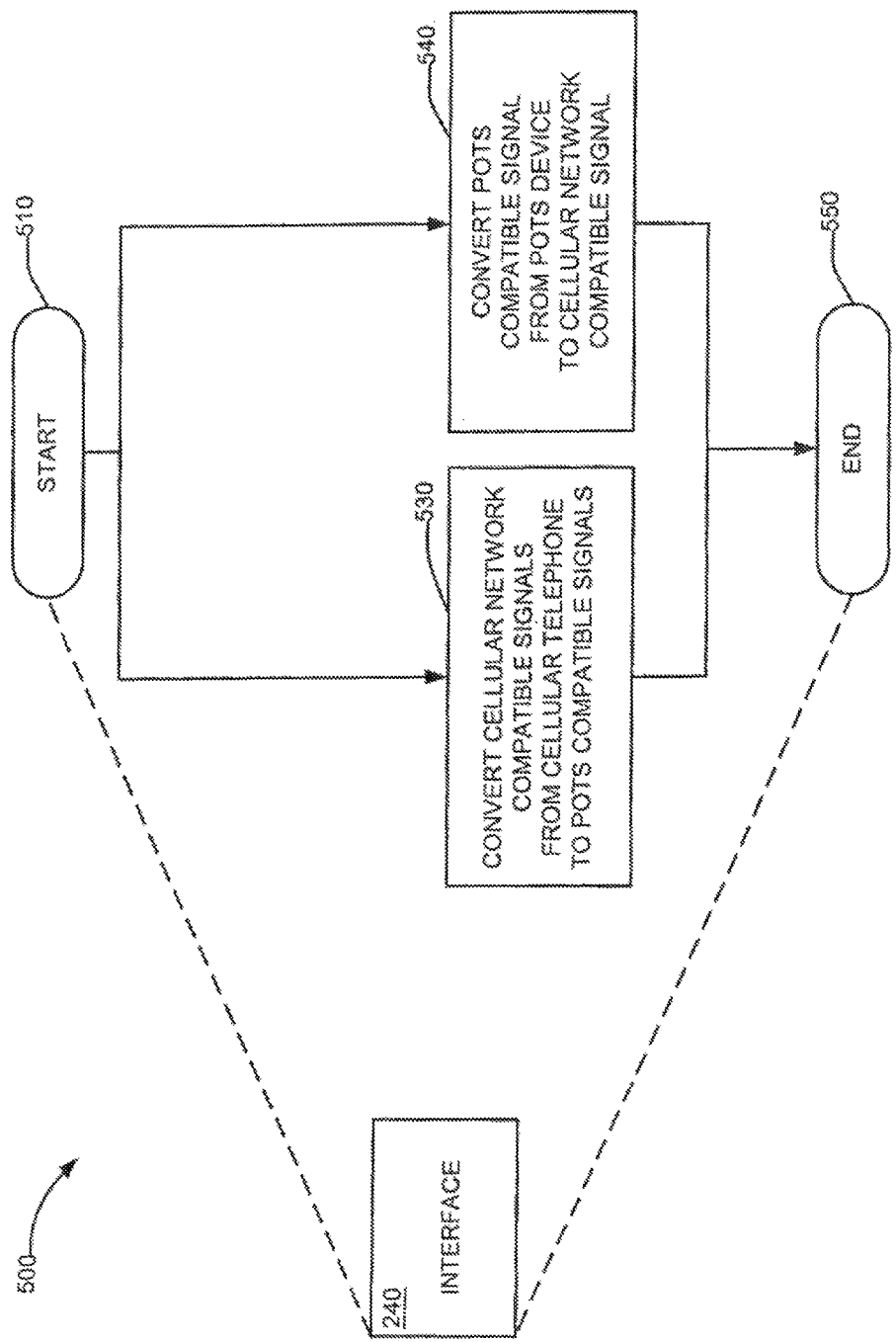
FIG. 5 is a flowchart showing one illustrative embodiment of the method for interfacing POTS devices with cellular networks.

FIG. 5 is a flowchart showing one illustrative embodiment of the method for interfacing POTS devices with cellular networks. In a broad sense, once a POTS device 140, 150 (FIG. 2) has been coupled to a cellular telephone 305 (FIG. 3) through an interface device 240 (FIG. 2), this illustrative embodiment may be seen as converting, in step 530, cellular network compatible signals from the cellular telephone 305 (FIG. 3) to POTS compatible signals, and converting, in step 540, POTS compatible signals from the POTS devices 140, 150 (FIG. 2) to cellular network compatible signals. In a preferred illustrative embodiment, the converting steps 530, 540 are performed at the interface device 240.

FIGS. 6A and 6B are flowcharts showing one illustrative embodiment of the method associated with the conversion 530 of cellular network compatible signals to POTS compatible signals. As an initial matter, the cellular network compatible signals are received through the cellular telephone 305 (FIG. 3). Thus, in step 610, the system receives an incoming call through the cellular telephone 305 (FIG. 3). Once the incoming call is received 610, the system further receives, in step 620, an analog-audio signal 345 (FIG. 3) indicative of the incoming call from the cellular telephone 305 (FIG. 3). The received analog-audio signal 345 (FIG. 3) is then transmitted, in step 630, to an interface controller 370 (FIG. 3). The interface controller 370 (FIG. 3) generates, in step 640, a ring tone in response to receiving the analog-audio signal 345 (FIG. 3). In a preferred illustrative embodiment, the ring tone is generated 640 by a tone generator 375 (FIG. 3). The generated 640 ring tone is conveyed, in step 650, to the POTS devices 140, 150 (FIG. 2), and, when the POTS device 140, 150 (FIG. 2) is "picked up," an off-hook signal is generated, in step 660, and conveyed, in step 670, to the interface controller 370 (FIG. 3). This triggers the interface controller 370 (FIG. 3) to activate the audio relay 365 (FIG. 3), and analog-audio signals 345 (FIG. 3) are exchanged, in step 680, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 7A:
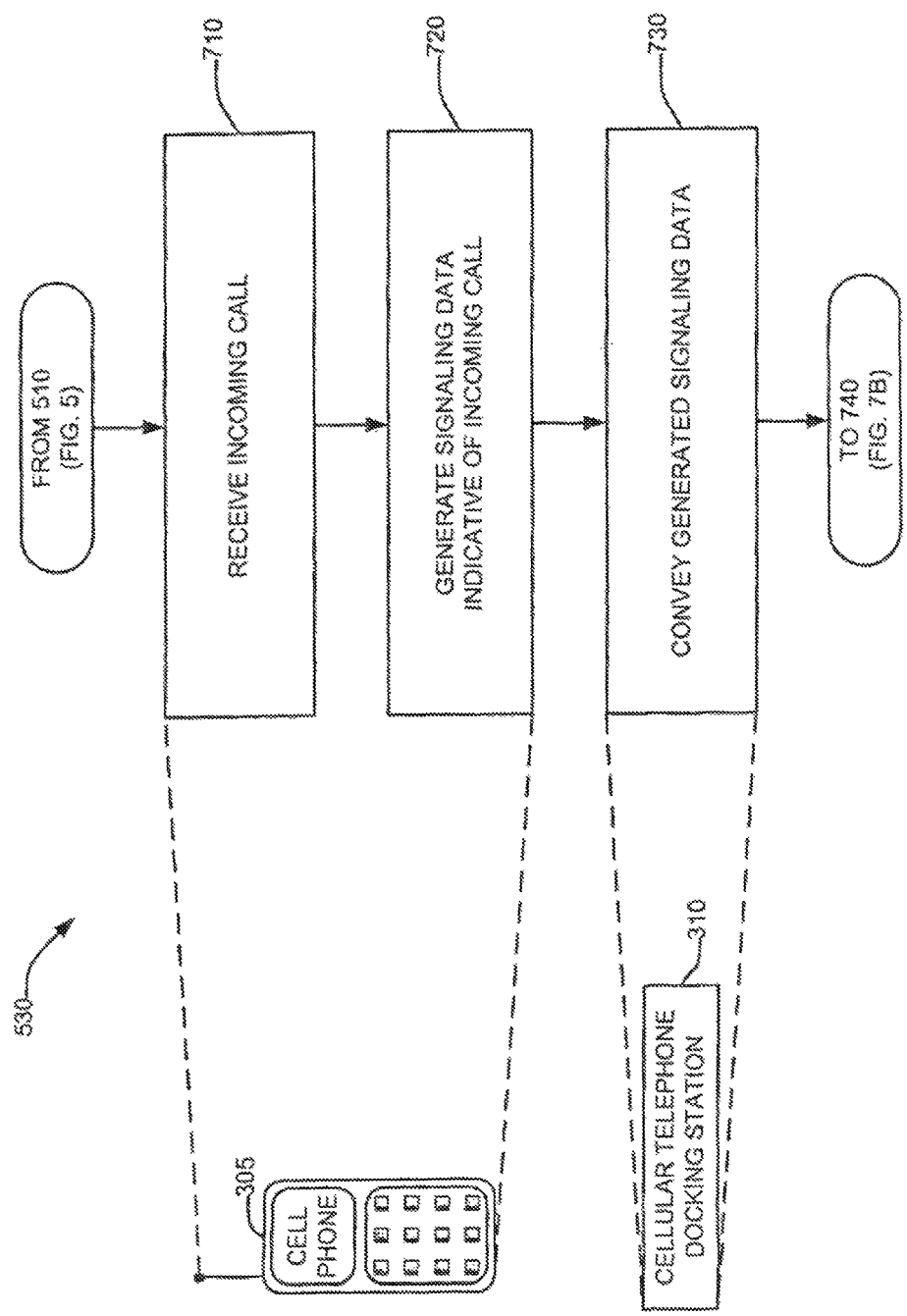
FIGS. 7A and 7B are flowcharts showing another illustrative embodiment of the method associated with the conversion of cellular network compatible signals to POTS compatible signals.
Figure 7B:
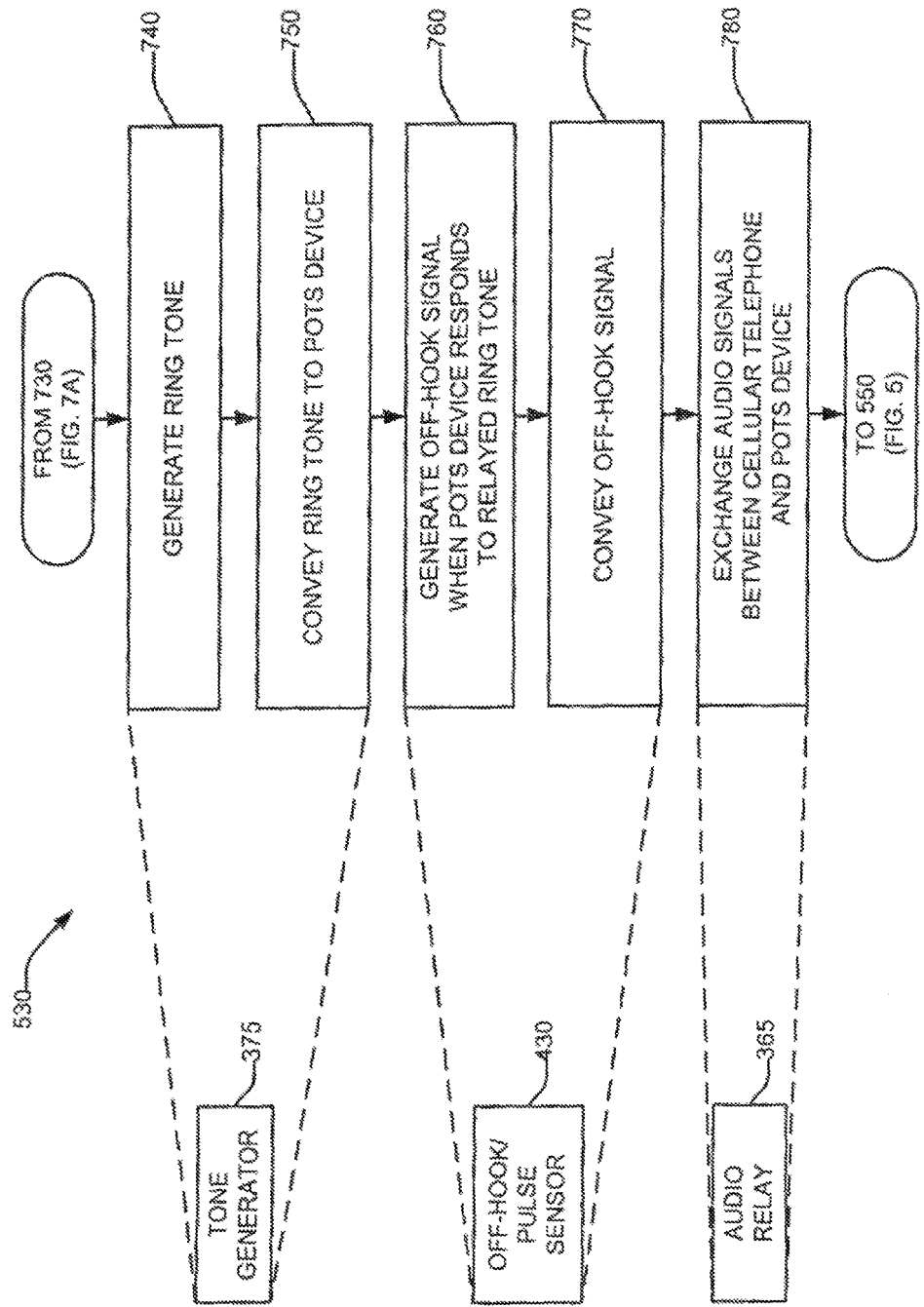

FIGS. 7A and 7B are flowcharts showing another illustrative embodiment of the method associated with the conversion 530 of cellular network compatible signals to POTS compatible signals. Similar to FIGS. 7A and 7B, the cellular network compatible signals here are received through the cellular telephone 305 (FIG. 3). Thus, in step 710, the system receives an incoming call through the cellular telephone 305 (FIG. 3). However, unlike the illustrative embodiment of FIGS. 6A and 6B, once the incoming call is received 710, the system generates, in step 720, signaling data on signaling line 355 (FIG. 3) indicative of the incoming call from the cellular telephone 305 (FIG. 3). The generated 720 signaling data on signaling line 355 (FIG. 3) is then conveyed, in step 730, to an interface controller 370 (FIG. 3). The interface controller 370 (FIG. 3) generates, in step 740, a ring tone in response to signaling data on signaling line 355 (FIG. 3). In a preferred illustrative embodiment, the ring tone is generated 740 by a tone generator 375 (FIG. 3). The generated 740 ring tone is conveyed, in step 750, to the POTS devices 140, 150 (FIG. 2), and, when the POTS device 140, 150 (FIG. 2) is "picked up," an off-hook signal is generated, in step 760, and conveyed, in step 770, to the interface controller 370 (FIG. 3). This triggers the interface controller 370 (FIG. 3) to activate the audio relay 365 (FIG. 3), and analog-audio signals 345 (FIG. 3) are exchanged, in step 780, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 8:
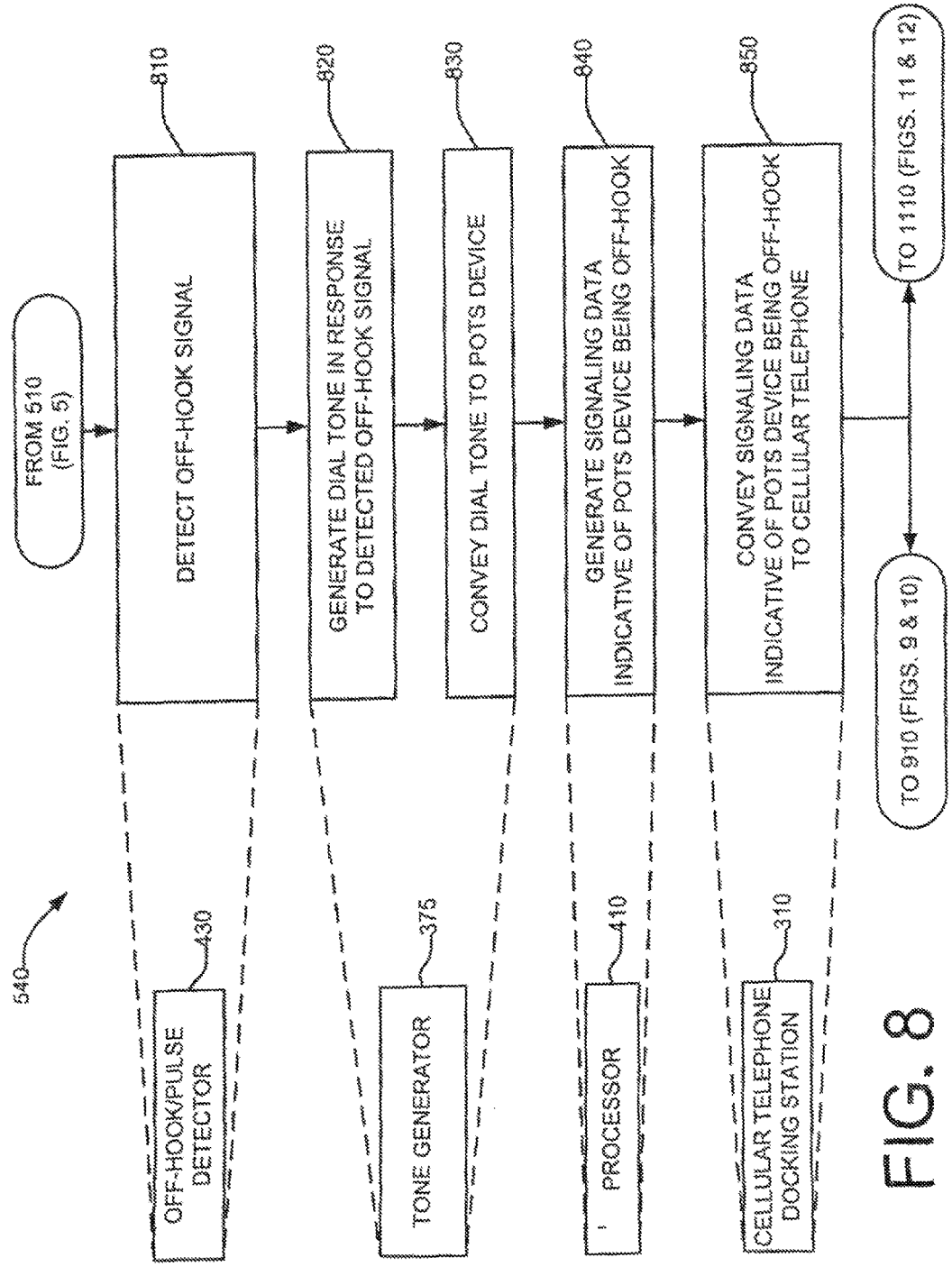
FIG. 8 is a flowchart showing several steps associated with the conversion of POTS compatible signals to cellular network compatible signals.

FIG. 8 is a flowchart showing several steps associated with the conversion 540 of POTS compatible signals to cellular network compatible signals. As described above, the interface device 240 (FIG. 2) is configured to allow outgoing calls using either pulse-dialing or "tone" dialing. The method steps associated with pulse-dialing are different from the method steps associated with "tone" dialing. However, regardless of which type of dialing is employed, both methods share several of the initial steps. FIG. 8 describes the shared initial steps associated with an outgoing call from a POTS device 140, 150 (FIG. 2) through the cellular network. When a user "picks up" the phone 140 (FIG. 2) to place an outgoing call, the system detects, in step 810, an off-hook signal at the off-hook/pulse detector 430 (FIG. 4). The system then generates, in step 820, a dial tone in response to the detected off-hook signal. In an illustrative embodiment, the dial tone is generated 820 by the tone generator 375 (FIG. 3). The generated 820 dial tone is conveyed, in step 830, to the POTS device 140, 150 (FIG. 2) (i.e., to the person that is placing the outgoing call) to indicate that the system is ready for dialing. In addition to generating 820 the dial tone, the system further generates, in step 840 by the processor 410, signaling data on signaling line 355 (FIG. 3) that is indicative of the POTS device 140, 150 (FIG. 2) being off-hook. The generated 840 signaling data on signaling line 355 (FIG. 3) is then conveyed, in step 850, to the cellular telephone 305 (FIG. 3), either with or without modification, through the cellular phone docking station 310 (FIG. 3), thereby indicating to the cellular telephone 305 (FIG. 3) that a user has "picked up" the phone 140 (FIG. 2), and that an outgoing call may be initiated. Thus, in one illustrative embodiment, once the cellular phone 305 (FIG. 3) receives the indication that the user has "picked up" the phone 140 (FIG. 2), the cellular telephone 305 (FIG. 3) blocks incoming calls. Hence, at this point, the system is ready for either pulse dialing or "tone" dialing. In another illustrative embodiment, the step of generating 840 signaling data on signaling line 355 (FIG. 3) may be completed.

Figure 9:
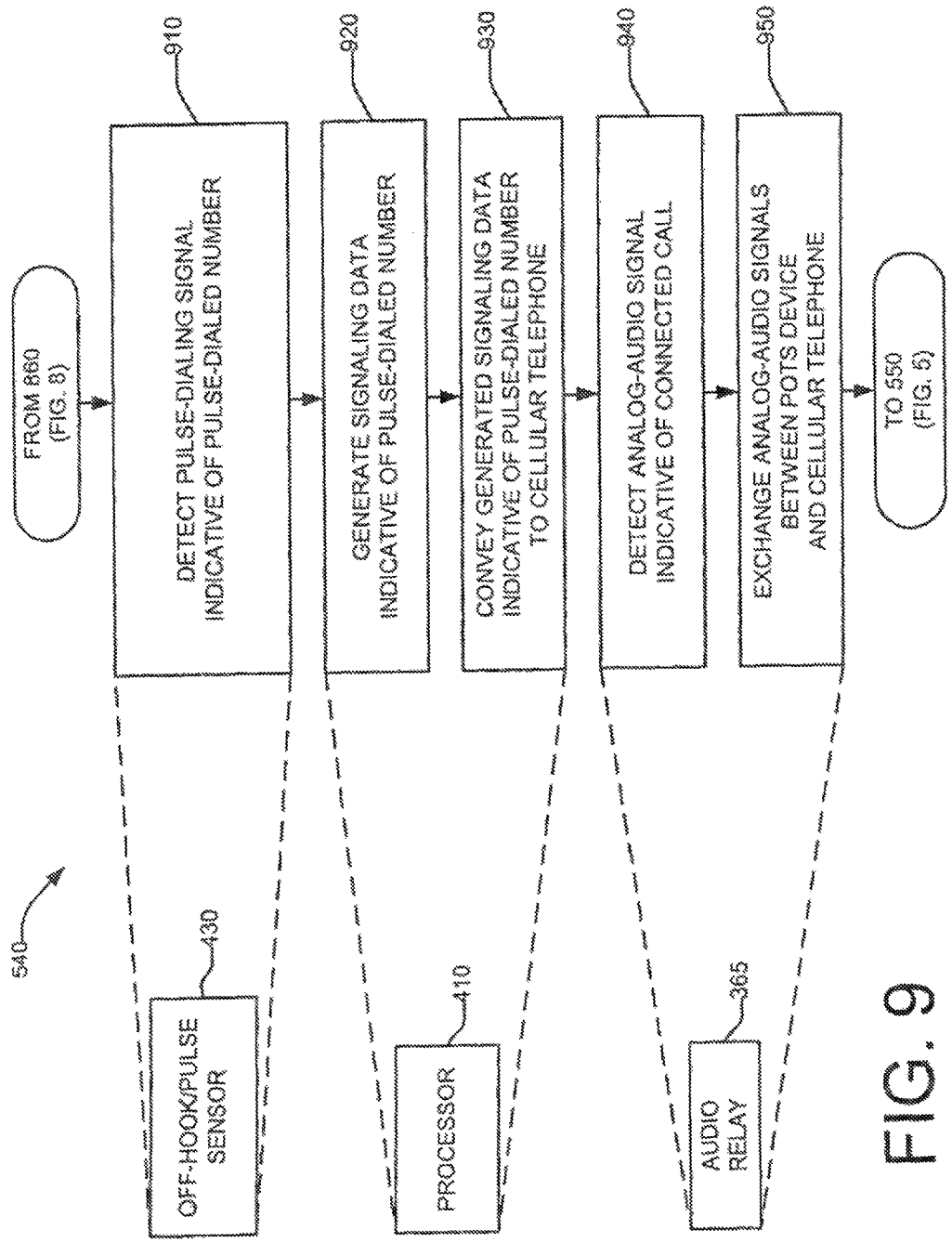
FIGS. 9 through 12 are flowcharts showing several illustrative embodiments of the method associated with the conversion of POTS compatible signals to cellular network compatible signals.
Figure 10:
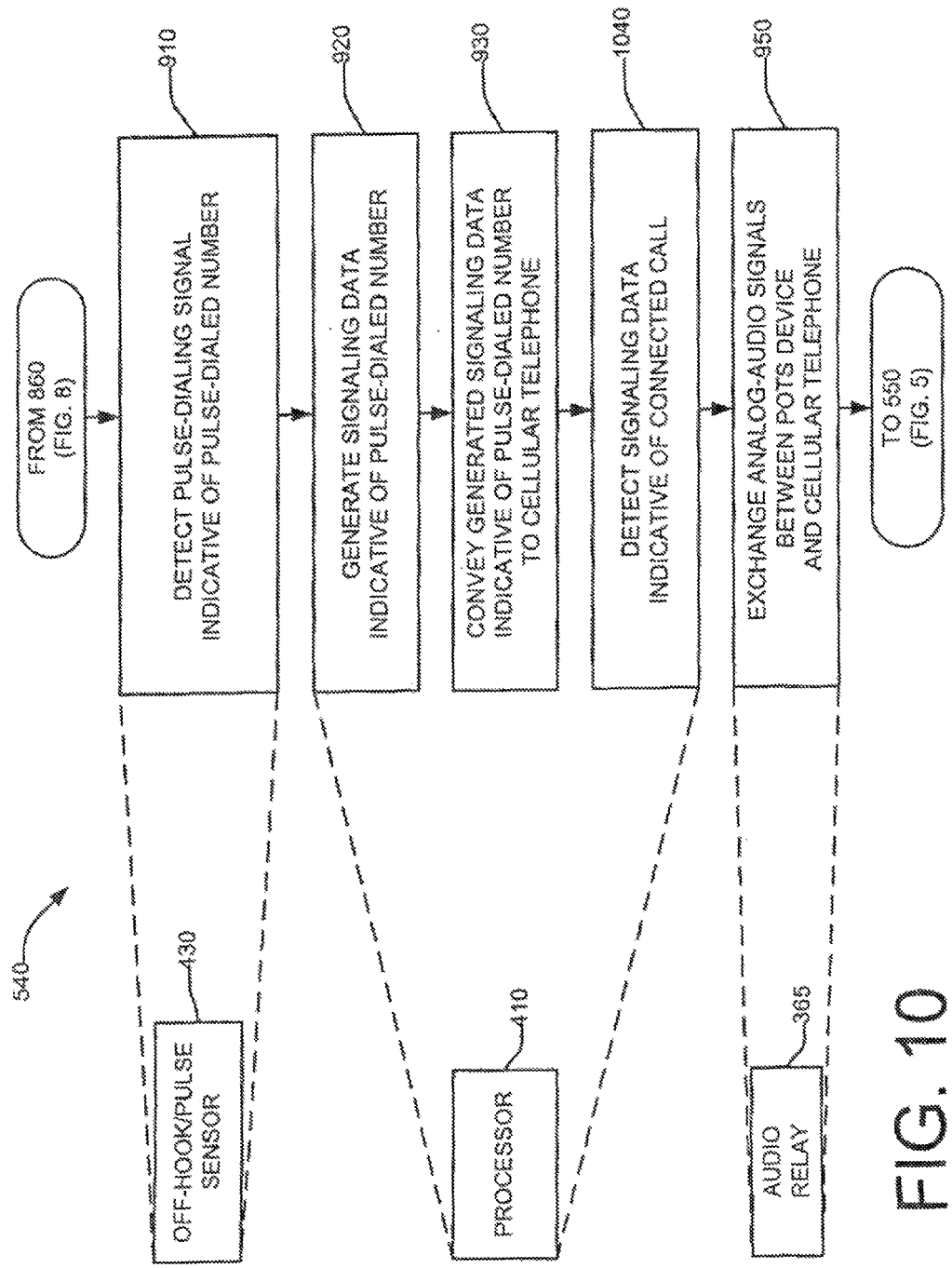

FIGS. 9 and 10 are flowcharts showing several illustrative embodiments of the method associated with pulse dialing. As shown in FIG. 9, in one illustrative embodiment, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number and a "send" command. The signaling data on signaling line 355 (FIG. 3) is conveyed, in step 930, to the cellular telephone 305 (FIG. 3), either with or without modification (e.g., amplification or attenuation), by the processor 410 (FIG. 4) through the cellular phone docking station 310 (FIG. 3).

In one illustrative embodiment, the numbers dialed by the POTS devices 140, 150 (FIG. 2) are stored in RAM 460, and, once a predetermined number of dialed numbers has been stored, the processor 410 (FIG. 4) conveys the stored numbers and a "send" command to the cellular telephone 305 (FIG. 3). In other words, upon receiving enough digits to dial a telephone number, as indicated by the configuration information in SRAM 450 (FIG. 4), the processor 410 (FIG. 4) commands the cellular telephone 305 (FIG. 3) to dial the outgoing number, thereby connecting a call from the POTS device 140, 150 (FIG. 2) through the cellular network. In another illustrative embodiment, the RAM 460 (FIG. 4) stores numbers as they are dialed by the POTS devices 140, 150 (FIG. 2). If, during dialing, the processor 410 (FIG. 4) detects a delay or a pause, then the processor 410 (FIG. 4) presumes that all of the digits of the telephone number have been dialed. Thus, the processor 410 (FIG. 4) commands the cellular telephone 305 to dial the outgoing number, thereby connecting the call from the POTS device 140, 150 (FIG. 2) through the cellular network. The command instructs the cellular telephone 305 (FIG. 3) to call the number that has been conveyed to the cellular telephone 305 (FIG. 3) by the signaling data on signaling line 355 (FIG. 3).

When the called party "picks up" the phone, the system detects, in step 940, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the outgoing call is connected between the cellular telephone 305 (FIG. 3) and the POTS device 140, 150 (FIG. 2), the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

FIG. 10 is a flowchart showing, in greater detail, another illustrative embodiment of the method associated with pulse dialing. As shown in FIG. 10, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number. The signaling data on signaling line 355 (FIG. 3) is conveyed, in step 930, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1040, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

Figure 11:
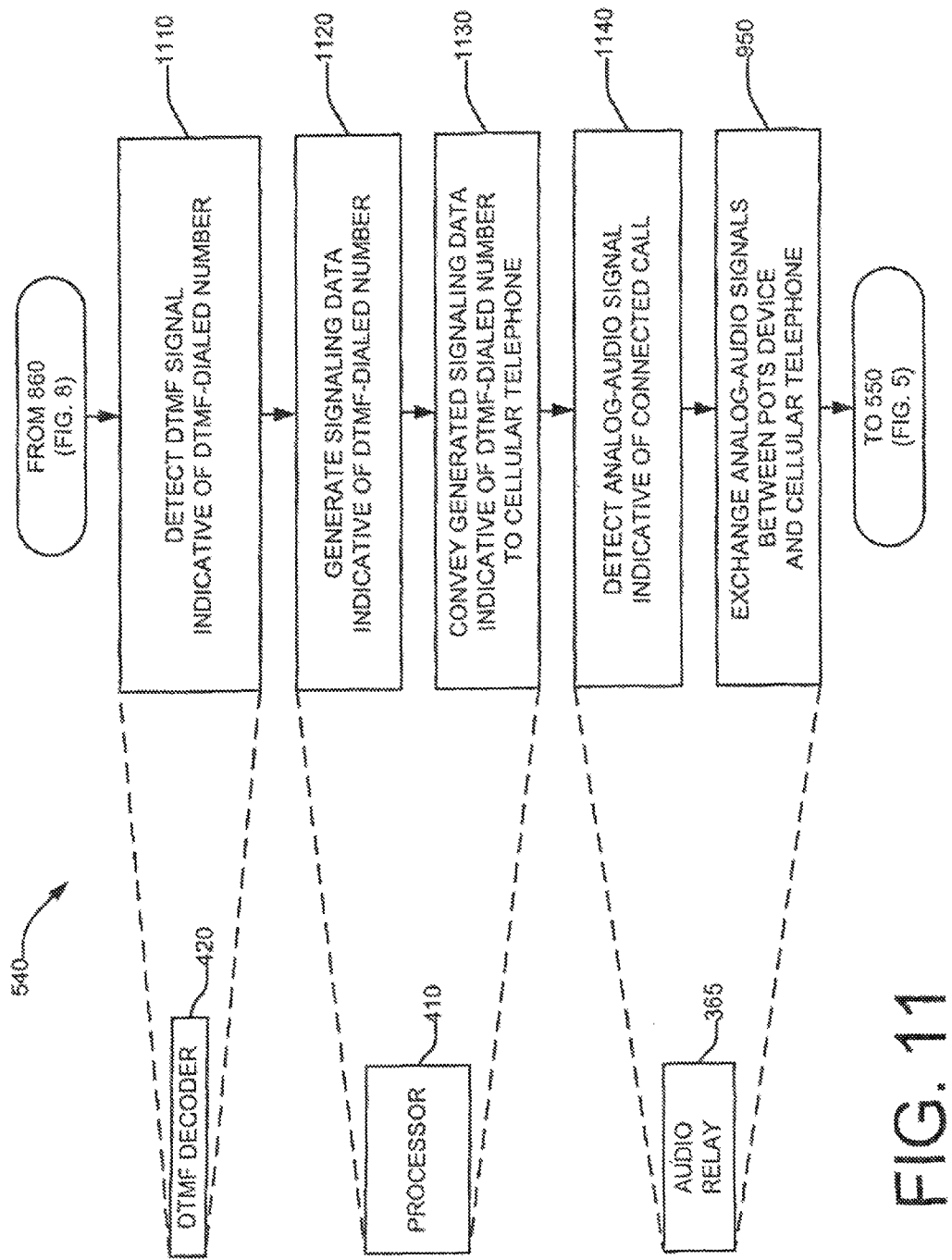
Figure 12:
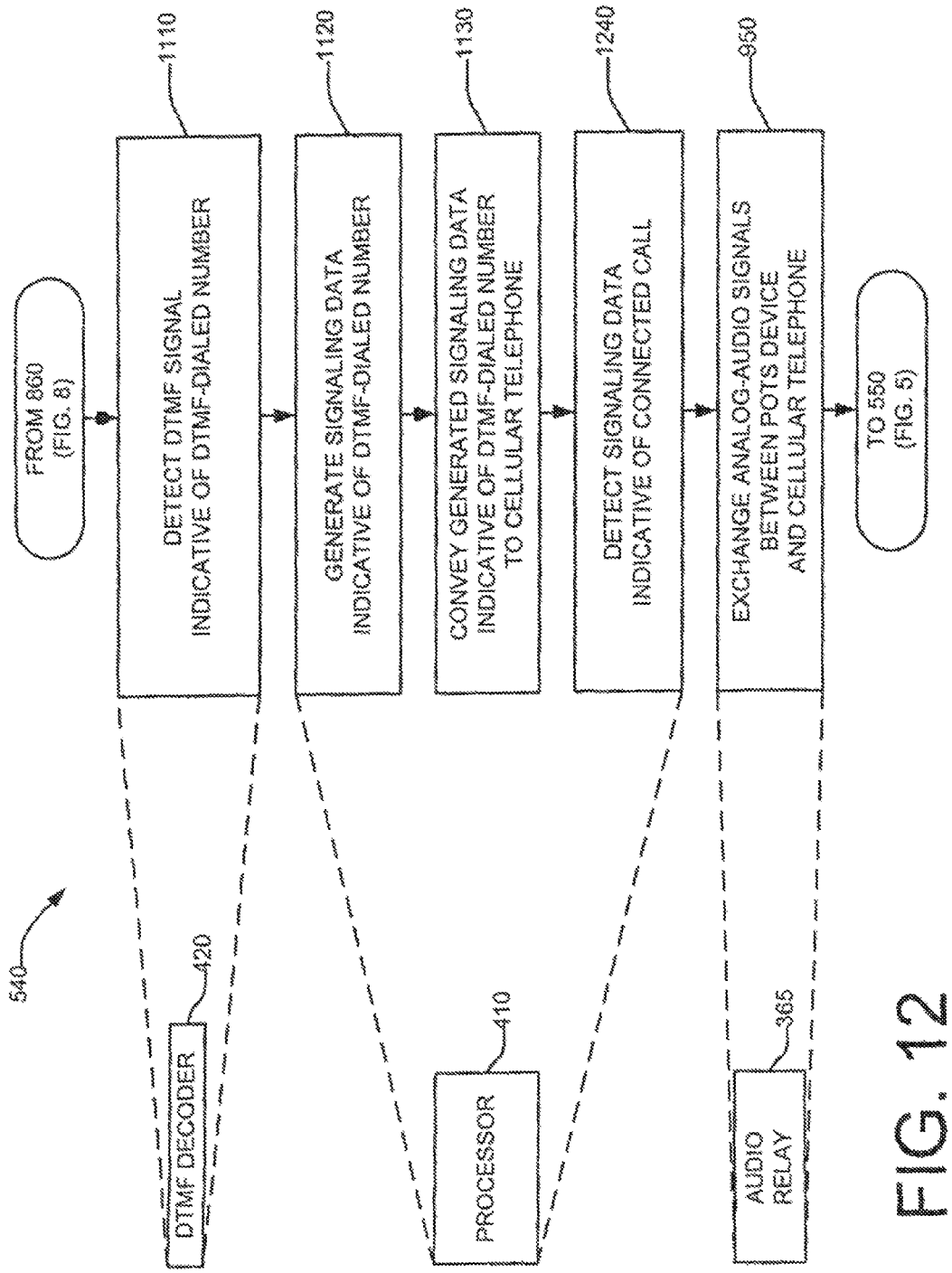

FIGS. 11 and 12 are flowcharts showing several illustrative embodiments of the method associated with "tone" dialing. As shown in FIG. 11, in one illustrative embodiment, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the system detects, in step 1140, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the incoming call is connected between the cellular telephone 305 (FIG. 3) and the POTS device 140, 150 (FIG. 2), the POTS device 140, 150 (FIG. 2) freely communicates through the cellular network.

FIG. 12 is a flowchart showing another illustrative embodiment of the method associated with "tone" dialing. As shown in FIG. 12, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1240, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

While several hardware components are shown with reference to FIGS. 3 and 4 to describe the interface controller 370, it will be clear to one of ordinary skill in the art that the interface controller 370 may be implemented in hardware, software, firmware, or a combination thereof. In one illustrative embodiment, the interface controller 370 (FIG. 3) is implemented in software or firmware that is stored in a memory and that is executed by a suitable instruction execution system. If implemented in hardware, as in FIGS. 3 and 4, the interface controller may be implemented with any or a combination of the following technologies: a discrete logic circuit having logic gates for implementing logic functions upon data signals, an Application Specific Integrated Circuit (ASIC) having appropriate combinational logic gates, a Programmable Gate Array (PGA), a Field Programmable Gate Array (FPGA), etc.

Figure 13:
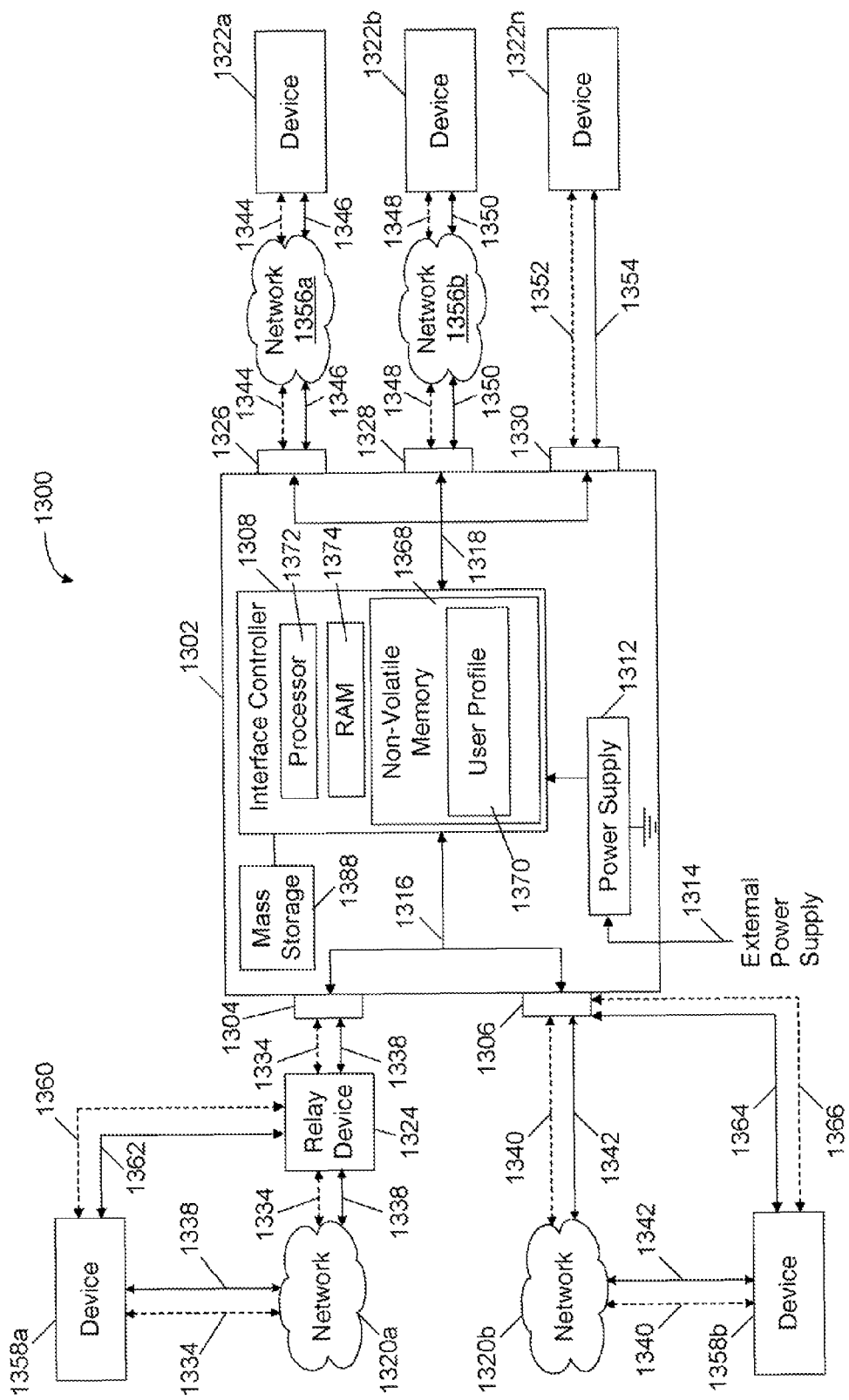
FIG. 13 is a block diagram showing an alternative illustrative embodiment of the interface device.

FIG. 13 is a block diagram showing a communications system 1300 including an interface device 1302 that is an alternative illustrative embodiment of the interface device 240 of FIG. 3. According to this embodiment, the interface device 1302 provides additional functionality, allowing any number of devices and networks to communicate with any number of additional devices and networks. In doing so, the interface device 1302 acts as a gateway for information, receiving and translating data between various formats for transmission over any type of transmission medium. As used herein, data comprises audio, video, voice, text, images, rich media, and any combination thereof.

Turning now to FIG. 13, the interface device 1302 provides communications between at least one of the devices 1358*a*, 1358*b* and at least one of the user devices 1322*a*-1322*n*. Communications provided between the devices 1358*a*, 1358*b* and the user devices 1322*a*-1322*n* via the interface device 1302 may include data comprising audio, video, voice, text, images, rich media, or any combination thereof. The devices 1358*a*, 1358*b* and the user devices 1322*a*-1322*n* may include communications devices capable of sending and receiving communications including, but are not limited to, cellular telephones, VoIP phones, WI-FI phones, POTS phones, computers, Personal Data Assistants (PDAs), Digital Video Recorders (DVRs), and televisions. According to one embodiment, the devices 1358*a*, 1358*b* may be associated with communications networks 1320*a*, 1320*b* such that communications provided by the devices are sent via the communications networks, and communications directed to the devices are delivered via the communications networks. Similarly, the user devices may be associated with communications networks such that communications provided by the user devices are sent via the communications networks, and communications directed to the user devices are delivered via the communications networks as illustrated by the user devices 1322*a*, 1322*b* and the communications networks 1356*a*, 1356*b* in FIG. 13. The communications networks 1320*a*, 1320*b* and 1356*a*, 1356*b* may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a Worldwide Interoperability for Microwave Access (WiMax) network, or a cellular network. Alternatively, the communications networks 1320a, 1320b and 1356a, 1356b may be a wired network such as, but not limited to, a wired Wide Area Network (WAN), a wired (Local Area Network) LAN such as the Ethernet, a wired Personal Area Network (PAN), or a wired Metropolitan Area Network (MAN).

The interface device 1302 may include at least one interface 1306 for communicating directly with the device 1358b and for communicating with the communications network 1320b associated with the device 1358b. It will be appreciated by those skilled in the art that the interface 1306 may comprise a wireline or wireless adapter for communicating with the device 1358b and with the communications network 1320b, which may include one of the wired or wireless networks described above. The interface 1306 may conform to a variety of wired network standards for enabling communications between the interface device 1302 and the device 1358b via a wired signaling connection 1364 and between the interface device and the communications network 1320b via a wired signaling connection 1342. The interface 1306 may include, but is not limited to, a coaxial cable interface conformed to MPEG standards, POTS standards, and Data Over Cable Service Specifications (DOCSIS). The interface 1306 may also conform to Ethernet LAN standards and may include an Ethernet interface, such as an RJ45 interface (not shown). The interface 1306 may further include a twisted pair interface conformed to POTS standards, Digital Subscriber Line (DSL) protocol, and Ethernet LAN standards. Moreover, the interface 1306 may include a fiber optics interface conformed to Synchronous Optical Network (SONET) standards and Resilient Packet Ring standards. It will be appreciated that the interface 1306 may also conform to other wired standards or protocols such as High Definition Multimedia Interface (HDMI).

The interface 1306 may further conform to a variety of wireless network standards for enabling communications between the interface device 1302 and the device 1358b via a wireless signaling connection 1366 and between the interface device and the communications network 1320b associated with the device via a wireless signaling connection 1340. The interface 1306 may include a cellular interface conformed to Advanced Mobile Phone System (AMPS) standards, Global System for Mobile Communications (GSM) standards, and Cellular Digital Packet Data (CDPD) standards for enabling communications between the interface device 1302 and the communications network 1320b. The interface 1306 may also include a WI-FI interface conformed to the 802.11x family of standards (such as 802.11a, 802.11b, and 802.11g). The interface 1306 may further include a WiMax interface conformed to the 802.16 standards. Moreover, the interface 1306 may include at least one of a satellite interface conformed to satellite standards or a receiver conformed to over-the-air broadcast standards such as, but not limited to, National Television System Committee (NTSC) standards, Phase Alternating Line (PAL) standards, and high definition standards. It will be appreciated that the interface 1306 may also conform to other wireless standards or protocols such as BLUETOOTH, ZIGBEE, and Ultra Wide Band (UWB). According to various embodiments, the interface device 1302 may include any number of interfaces 1306, each conformed to at least one of the variety of wired and wireless network standards described above for receiving data in a variety of formats from multiple devices and networks via multiple transmission media.

In one embodiment, the interface device 1302 may communicate with the device 1358a and with the communications network 1320a associated with the device 1358a via a relay device 1324. The relay device 1324 operates as a transceiver for the interface device 1302 to transmit and receive data to and from the device 1358a and the communications network 1320a. The relay device 1324 may modify the signaling data appropriately (e.g., amplify, attenuate, reformat, etc.), or, alternatively, the relay device 1324 may relay the signaling data without modification. Additionally, the relay device 1324 may be fixed, or may be portable to provide a user with a remote means for accessing data from a network or other device via the interface device 1302. Examples of fixed relay devices include, but are not limited to, a DSL modem, a cable modem, a set top device, and a fiber optic transceiver. Examples of portable relay devices include portable communications devices such as, but not limited to, a cellular telephone, a WI-FI telephone, a VoIP telephone, a PDA, a satellite transceiver, or a laptop.

The relay device 1324 may also include a combination of a fixed device and a portable device. For example, the relay device 1324 may comprise a cellular telephone in combination with a docking station. The docking station remains connected to the interface device 1302, through wired or wireless means, while the cellular telephone may be removed from the docking station and transported with a user. In this embodiment, data received from the interface device 1302 at the cellular telephone may be taken with the user to be utilized at a remote location. While the cellular telephone is not docked with the docking station, communication would occur between the device 1358a and the interface device 1302 as well as between the communications network 1320a and the interface device via a direct connection or via an alternate relay device.

The device 1358a may provide data via signals, which are transmitted either over a wireless signaling connection 1360 or over a wired signaling connection 1362 directly to the relay device 1324. Alternatively, the communications network 1320a associated with the device 1358a may provide data via signals, which are transmitted either over a wireless signaling connection 1334 or over a wired signaling connection 1338 to the relay device 1324. The data may include audio, video, voice, text, rich media, or any combination thereof. Signals provided by the device 1358a over the wireless signaling connection 1360 to the relay device 1324 and signals provided by the communications network 1320a over the wireless signaling connection 1334 to the relay device may be in a format compatible with a cellular network, a WI-FI network, a WiMax network, a BLUETOOTH network, or a satellite network. Signals provided by the device 1358a over the wired signaling connection 1362 to the relay device 1324 and signals provided by the communications network 1320a over the wired signaling connection 1338 may be in a format compatible with a DSL modem, a cable modem, a coaxial cable set top box, or a fiber optic transceiver.

Once the relay device 1324 receives data from the device 1358a or from the communications network 1320a, the relay device may transmit the data to an interface 1304 associated with the interface device 1302 via a signal over a wireless signaling connection 1334 or a wired signaling connection 1338. In one embodiment, the device 1358a and the communications network 1320a may communicate both directly with the interface device 1302 through the interface 1304 and with the interface device via the relay device 1324 through the interface 1304. The interface 1304 may conform to a variety of wireless network standards for enabling communications between the interface device 1302 and the relay device 1324. The interface 1304 may include a cellular interface conformed to AMPS, GSM standards, and CDPD standards for enabling communications between the interface device 1302 and the relay device 1324. The interface 1304 may also include a WI-FI interface conformed to the 802.11x family of standards (such as 802.11a, 802.11b, and 802.11g). The interface 1304 may further include a WiMax interface conformed to the 802.16 standards. Moreover, the interface 1304 may include at least one of a cordless phone interface or a proprietary wireless interface. It will be appreciated by one skilled in the art that the interface 1304 may also conform to other wireless standards or protocols such as BLUETOOTH, ZIGBEE, and UWB.

The interface 1304 may also conform to a variety of wired network standards for enabling communications between the interface device 1302 and the relay device 1324. The interface 1304 may include, but is not limited to, microphone and speaker jacks, a POTS interface, a USB interface, a FIREWIRE interface, a HDMI, an Enet interface, a coaxial cable interface, an AC power interface conformed to Consumer Electronic Bus (CEBus) standards and X.10 protocol, a telephone interface conformed to Home Phoneline Networking Alliance (HomePNA) standards, a fiber optics interface, and a proprietary wired interface.

Signals provided by the relay device 1324 over the wireless signaling connection 1334 to the interface 1304 may be in a format compatible with a cellular network, a WI-FI network, a WiMax network, a BLUETOOTH network, or a proprietary wireless network. Signals provided over the wired signaling connection 1338 to the interface 1304 may be in a format compatible with microphone and speaker jacks, a POTS interface, a USB interface, a FIREWIRE interface, an Enet interface, a coaxial cable interface, an AC power interface, a telephone interface, a fiber optics interface, or a proprietary wired interface.

Data received at the interfaces 1304, 1306 either directly from the devices 1358a, 1358b and the communications networks 1320a, 1320b or via the relay device 1324 is provided to an interface controller 1308 via a signaling line 1316. The interface controller 1308 is similar to the interface controller 370 of the interface device 240 described above with respect to FIG. 3. Once the interface controller 1308 receives data from the devices 1358a, 1358b or the communications networks 1320a, 1320b, the interface controller 1308 identifies one or more of the user devices 1322a-1322n and/or one or more of the communications networks 1356a, 1356b to receive the data, identifies a format compatible with the one or more receiving devices and/or receiving networks, and translates the current format of the data to the format compatible with the one or more receiving devices and/or receiving networks, which is further discussed below. After the data is translated, the interface controller 1308 provides the data to one or more of the interfaces 1326, 1328, and 1330 associated with the one or more devices and or networks identified to receive the translated data via a signaling line 1318. For example, if the interface controller 1308 identifies a POTS telephone as the device to receive the translated data, then the interface controller provides the data via the signaling line 1318 to an interface compatible with POTS standards.

The interface controller 1308 is further configured to receive data from the user devices 1322a-1322n and the communications networks 1356a, 1356b, identify one or more of the devices 1358a, 1358b and/or one or more of the communications network 1320a, 1320b to receive the data, identify a format compatible with the one or more receiving devices and/or receiving networks, and translate the current format of the data to the format compatible with the one or more receiving devices and/or receiving networks. Thus, the interface controller 1308 provides a bi-directional communication for all data transmitted between the devices 1358a, 1358b and the user devices 1322a-1322n, between the devices 1358a, 1358b and the communications networks 1356a, 1356b, between the communications networks 1320a, 1320b and the user devices 1322a-1322n, and between the communication networks 1320a, 1320b and the communications network 1356a, 1356b. In an illustrative embodiment, the interface controller 1308 is also configured to either amplify or attenuate the signals carrying the data transmitted between the communications networks and the devices.

The interfaces 1326, 1328, and 1330 may transmit the data to the user devices 1322a-1322n directly, as illustrated by the interface 1330 in FIG. 13, or the interfaces 1326, 1328, and 1330 may transmit the data to the communications networks 1356a, 1356b associated with the devices 1322a, 1322b, as illustrated by the interfaces 1326, 1328 in FIG. 13. In either case, the interfaces 1326, 1328, and 1330 transmit the data via a signal over wireless signaling connections 1346, 1350, and 1354 or wired signaling connections 1344, 1348, and 1352, respectively. In another embodiment, one of the interfaces 1326, 1328, and 1330 may communicate the data to two or more of the devices 1322a-1322n and/or communications networks 1356a, 1356b.

The interfaces 1326, 1328, and 1330 may conform to a variety of wireless network standards for enabling communications between the interface device 1302 and the devices 1322a-1322n or the communications networks 1356a, 1356b. The interfaces 1326, 1328, and 1330 may include at least one cellular interface conformed to AMPS, GSM standards, and CDPD standards for enabling communications between the interface device 1302 and the devices 1322a, 1322b, and 1322n. The interfaces 1326, 1328, and 1330 may also include at least one WI-FI interface conformed to the 802.11x family of standards (such as 802.11a, 802.11b, and 802.11g). The interfaces 1326, 1328, and 1330 may further include at least one WiMax interface conformed to the 802.16 standards. Moreover, the interfaces 1326, 1328, and 1330 may include at least one of a cordless phone interface or a proprietary wireless interface. It will be appreciated by those skilled in the art that the interfaces 1326, 1328, and 1330 may also conform to other wireless standards or protocols such as BLUETOOTH, ZIGBEE, and UWB.

The interfaces 1326, 1328, and 1330 may also conform to a variety of wired network standards for enabling communications between the interface device 1302 and the devices 1322a-1322n or the communications networks 1356a, 1356b. The interfaces 1326, 1328, and 1330 may include, but are not limited to, microphone and speaker jacks, a POTS interface, a USB interface, a FIREWIRE interface, a HDMI, an Enet interface, a coaxial cable interface, an AC power interface conformed to CEBus standards and X.10 protocol, a telephone interface conformed to HomePNA standards, a fiber optics interface, and a proprietary wired interface.

Signals provided by the interfaces 1326, 1328, and 1330 over the wireless signaling connections 1346, 1350, and 1354 may be in a format compatible with a cellular network, a WI-FI network, a WiMax network, a BLUETOOTH network, or a proprietary wireless network. Signals provided over the wired signaling connections 1344, 1348, and 1352 may be in a format compatible with microphone and speaker jacks, a POTS interface, a USB interface, a FIREWIRE interface, a HDMI, an Enet interface, a coaxial cable interface, an AC power interface, a telephone interface, a fiber optics interface, or a proprietary wired interface.

For some interfaces such as, but not limited to, POTS interfaces, functionality of the interfaces that provide service from a network to a user device is different from the functionality of the interfaces that receive service from the network. Interfaces that deliver service from a network to a user device are commonly referred to as Foreign eXchange Subscriber (FXS) interfaces, and interfaces that receive service from the network are commonly referred to as Foreign eXchange Office (FXO) interfaces. In general, the FXS interfaces provide the user device dial tone, battery current, and ring voltage, and the FXO interfaces provide the network with on-hook/off-hook indications. In an embodiment, the interfaces 1326, 1328, and 1330 are the FXS interfaces that deliver data from the communications networks 1320*a*, 1320*b* to the user devices 1322*a*-1322*n*, and the interfaces 1304,1306 are the FXO interfaces that receive data from the communications networks 1320*a*, 1320*b*.

As mentioned above, the interface controller 1308 may control the translation of the data received at the interface device 1302 from one format to another. In particular, the interface controller 1308 is configured to control the behavior of the relay device 1324 and any additional components necessary for translating data in order to effectuate the translation of the data from one format to another format. For example, as described above, for translating between POTS compatible signals and cellular network compatible signals, the interface controller 1302 may communicate with an audio relay and a tone generator, and includes an off-hook/pulse sensor and a DTMF decoder. The interface device 1302 shares the same capabilities for translating between POTS compatible signals and cellular network compatible signals as described above with regard to the interface device 240 illustrated in FIG. 3, but the interface device 1302 also has additional translation capabilities for translating between any number and type of other signals. Consequently, the interface device 1302 may comprise any components necessary for a given translation.

According to one embodiment of the present invention, the interface controller 1308 comprises a processor 1372, RAM 1374, and non-volatile memory 1368 including, but not limited to, ROM and SRAM. The non-volatile memory 1368 is configured to store logic used by the interface controller 1308 to translate data received at the interface device 1302. In this sense, the non-volatile memory 1368 is configured to store the program that controls the behavior of the interface controller 1308, thereby allowing the interface controller 1308 to translate data signals from one format to another. The non-volatile memory 1368 is also adapted to store configuration information and may be adapted differently depending on geographical area and signal formats and protocols. The configuration information stored on the non-volatile memory 1368 of the interface controller 1308 may include default configuration information originally provided on the interface device 1302. In another embodiment of the present invention, the configuration information stored on the non-volatile memory 1368 may include a user profile 1370 associated with one or more of the devices 1322*a*-1322*n*, one or more of the communications networks 1356*a*, 1356*b*, or a combination thereof.

The user profile 1370 may include user preferences established by one or more users of the interface device 1302 regarding formats in which data is to be transmitted and received, translations to be performed on the data, the devices and networks to send and receive the data, as well as any other configuration information associated with transmitting data via the interface device 1302. The RAM 1374 is configured to store temporary data during the running of the program by the processor 1372, allowing the RAM to operate as a memory buffer for times in which the data is being received at a rate that is faster than the interface device 1302 can determine a proper recipient, translate the data, and transmit the data to the proper recipient. The processor 1372 is configured to generate signaling data on the signaling line 1316, which may instruct the relay device 1324 to dial a number, connect to a network, etc. The interface device 1302 may further include a mass storage 1388 such as a disk, tape, or optical storage. The mass storage 1388 is used for storing data from devices 1358*a*, 1358*b*, 1322*a*-1322*n*, and from communications networks 1320*a*, 1320*b*, 1356*a*, and 1356*b*.

As mentioned above, the interface device 1302 contains logic within the interface controller 1308 that is used by the interface controller to translate data received at the interface device. The logic may include any number and types of data translation standards. In particular, the interface controller 1308 uses the logic to translate the data received at one of the interfaces 1304, 1306, 1326, 1328, 1330 of the interface device 1302 from at least one format to at least one other format. How the data received at the interface device 1302 is translated may be based on any one or combination of factors. According to one embodiment, the type of data translation may depend on the source and destination of the data. It should be understood that although the description contained herein describes the devices 1358*a*, 1358*b* and the communications networks 1320*a*, 1320*b* as the source devices and the source networks, respectively, and the user devices 1322*a*-1322*n* and the communications networks 1356*a*, 1356*b* as the destination devices and the destination networks, respectively, embodiments contemplate data transfer from the user devices 1322*a*-1322*n* and from the communications networks 1356*a*, 1356*b* to the devices 1358*a*, 1358*b* and to the communications networks 1320*a*, 1320*b* as well as bidirectional communication and data transfer. As an example, data arriving at the interface device 1302 that is directed to a POTS device would be translated to a format compatible for transmission over the appropriate medium associated with the POTS device.

According to another embodiment, the type of data translation may depend on default configuration information originally provided on the interface device 1302. For example, the default configuration information may be provided by a service provider offering the interface device 1302 to customers. In yet another embodiment, the type of data translations may depend on a user profile 1370 stored on the interface device 1302. As discussed above, the user profile 1370 may be configured by a user of the interface device 1302 to include user preferences regarding formats in which data is to be transmitted and received, translations to be performed on the data, the devices and networks to send and receive the data, as well as any other configuration information associated with transmitting data via the interface device 1302.

When configuring the user profile 1370, the user may specify the appropriate destination device, transmission medium, and filtering options for data received under any variety of circumstances. For example, the user may configure the interface device 1302 such that all incoming rich media content is translated for transmission to and display on the device 1322*b*, which, as discussed above, may include a television. The user might configure the interface device 1302 such that only media from specific websites be allowed to download to a device or network via the interface device 1302. In doing so, the user profile 1370 might include access data such as a user name and password that will be required from the user prior to accessing a specific type or quantity of data. The user profile 1370 may additionally contain priorities for translation and transmission when multiple data signals and data formats are received at the interface device 1302. For example, a user may specify that audio data be given transmission priority over other types of data. The priority may be based on a specific transmitting or receiving device, the type of transmitting or receiving device, the format of the data being transmitted or received, the transmission medium of the transmitting or receiving signals, or any other variable. As used herein, the format associated with the data may include a transmission medium associated with the signal carrying the data, a standard associated with the data, or the content of the data.

It should be understood by one skilled in the art that data translations as discussed above may include several different types of data conversion. First, translating data may include converting data from a format associated with one transmission medium to another transmission medium. For example, audio data from an incoming telephone call may be translated from a wireless, cellular signal to a twisted pair wiring signal associated with POTS telephones. Next, data translation may include converting data from one type to another, such as when voice data from a telephone or network is translated into text data for display on a television or other display device. For example, data translation may include, but is not limited to MPEG 2 translation to MPEG 4, or the reverse, Synchronized Multimedia Interface Language (SMIL) to MPEG 1, or Macromedia Flash to MPEG 4.

Additionally, data translation may include content conversion or filtering such that the substance of the data is altered. For example, rich media transmitted from one or more of the devices 1358a, 1358b or one or more of the communications networks 1320a, 1320b may be filtered so as to extract only audio data for transmittal to one or more of the user devices 1322a-1322n or one or more of the communications networks 1356a, 1356b. Translation may further include enhancing the data, applying equalizer settings to the data, improving a poor quality signal carrying data based on, e.g., known characteristics of the device providing the data signal, degrading the data signal, or adding a digital watermark to the data to identify the device or the network associated with the data or the user sending the data. Translation may further include adding information to the data and annotating the data. Moreover, translation may include any combination of the above types of data conversions.

In one embodiment, data received at the interface controller 1308 may include a request for data. It should be understood that the request may be dialed telephone numbers, an IP address associated with a network or device, or any other communication initiating means. When a request for data is provided by one of the user devices 1322a-1322n, the devices 1358a, 1358b, the communications networks 1320a, 1320b, or the communications networks 1356a, 1356b, the interface controller 1308 receives the request and converts the request to a digital command. The digital command is transmitted as signaling data either on the signaling line 1316 to one or more of the interfaces 1304, 1306 or on the signaling line 1318 to one or more of the interfaces 1326, 1328, and 1330 based on the devices and/or communications networks identified to receive the request. Once received at one or more of the interfaces 1304, 1306 or one or more of the interfaces 1326, 1328, and 1330, the signaling data is transmitted to the destination devices and/or communications networks either directly or via the relay device 1324. If the signaling data is transmitted to the relay device 1324, the signaling data instructs the relay device to make the required connection to the identified devices 1358a, 1358b and/or the identified communications networks 1320a, 1320b.

When a connection is made between the device 1358a and one or more of the user devices 1322a-1322n, between the device 1358a and one or more of the communications networks 1356a, 1356b, between the communications network 1320a and one or more of the user devices 1322a-1322n, or between the communication network 1320a and one or more of the communications network 1356a, 1356b in response to a request for data, the relay device 1324 detects the connection and conveys a signal to the interface controller 1308. In this illustrative embodiment, in response to receiving the signal from the relay device 1324, the interface controller 1308 enables bi-directional communication of the requested data. If one of the devices and/or communications networks that requested the data disconnects, then the disconnect is detected by the interface controller 1308. In this illustrative embodiment, the interface controller 1308 terminates the bi-directional communication by generating another signal, which instructs the relay device 1324 to stop transmission and reception of the data. If, on the other hand, the relay device 1324 disconnects, then this is detected by the interface controller 1308, which, in response, terminates the bi-directional communication by stopping transmission and reception of the data.

While hardware components are shown with reference to FIG. 13 to describe the interface controller 370, it will be clear to one of ordinary skill in the art that the interface controller 370 may be implemented in hardware, software, firmware, or a combination thereof. In one illustrative embodiment, the interface controller 1308 is implemented in software or firmware that is stored in a memory and that is executed by a suitable instruction execution system. If implemented in hardware, as in FIG. 13, the interface controller 1308 may be implemented with any or a combination of the following technologies including, but not limited to, a discrete logic circuit having logic gates for implementing logic functions upon data signals, an ASIC having appropriate combinational logic gates, a PGA, a FPGA, other adaptive chip architectures, etc.

The power supply 1312 is configured to provide the components of the interface device 1302 with the requisite power similar to the power supply 335 discussed above in view of FIG. 3. In this sense, the power supply 1312 is connected to an external power supply 1314 from which it receives external power. The external power is converted by the power supply 1312 to a DC voltage, which is used to power the components of interface device 1302 and optionally, the relay device 1324.

Figure 14:
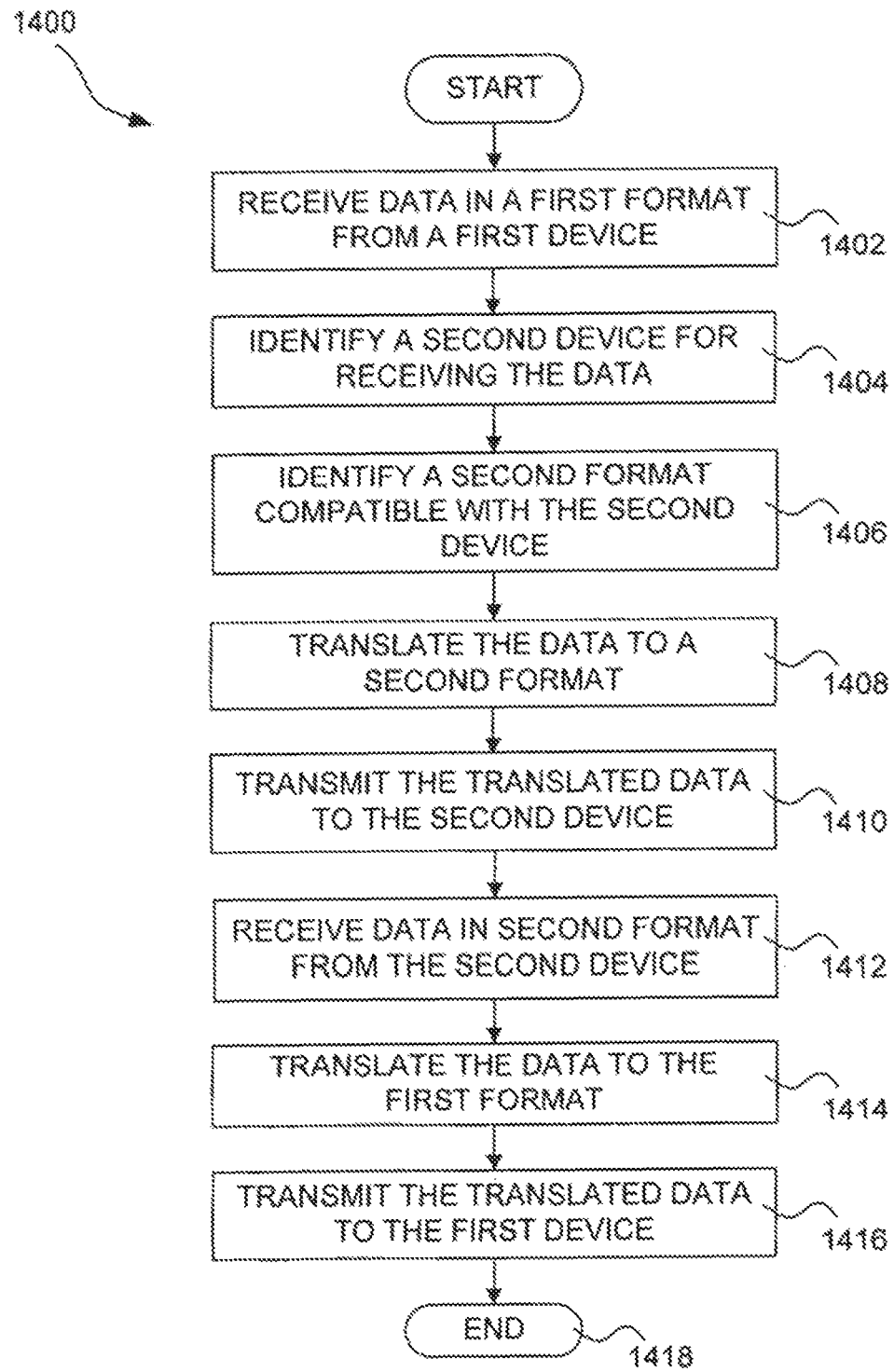
FIG. 14 is a flowchart showing an illustrative embodiment of the method and computer-readable medium associated with providing bi-directional communications between a first device and a second device.

Referring now to FIG. 14, additional details regarding the operation of the interface device 1302 for providing communications between a first device and a second device will be discussed. It should be appreciated that the logical operations of the various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing exemplary embodiments. Accordingly, the logical operations of FIG. 14 and other flow diagrams and making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the exemplary embodiments as recited within the claims attached hereto.

The routine 1400 begins at operation 1402, where data is received in a first format from a first device, such as the device 1358a. The data is received at an interface 1304 of interface device 1302. The interface device 1302 identifies a second device, such as the device 1322a for receiving the data at operation 1404. This identification may depend upon a user profile stored within the interface device 1302. Alternatively, identifying a second device may comprise selecting a second device that is compatible with the signal type or transmission medium corresponding to the data received at interface 1304. After identifying the second device 1322a, the interface device 1302 identifies a second format compatible with the second device 1322a at operation 1406. Similarly, this process may be based on a user profile or on the characteristics of the second device 1322a. For example, the second device may be selected based on a user profile that instructs a POTS telephone to receive all media received at interface 1304. Because the POTS telephone does not have the capability to display video, the interface device 1302 may identify the second format as containing only the audio portion of the received media.

At operation 1408, the data is translated to the second format for transmittal to the second device 1322a. The data is then transmitted to the second device 1322a at operation 1410. The communications capabilities of interface device 1302 are bi-directional. At operation 1412, data is received in a second format from the second device 1322a. This data is translated to the first format at operation 1414. After transmitting the translated data to the first device 1358a at operation 1416, the routine 1400 continues to operation 1418, where it ends.

Figure 15:
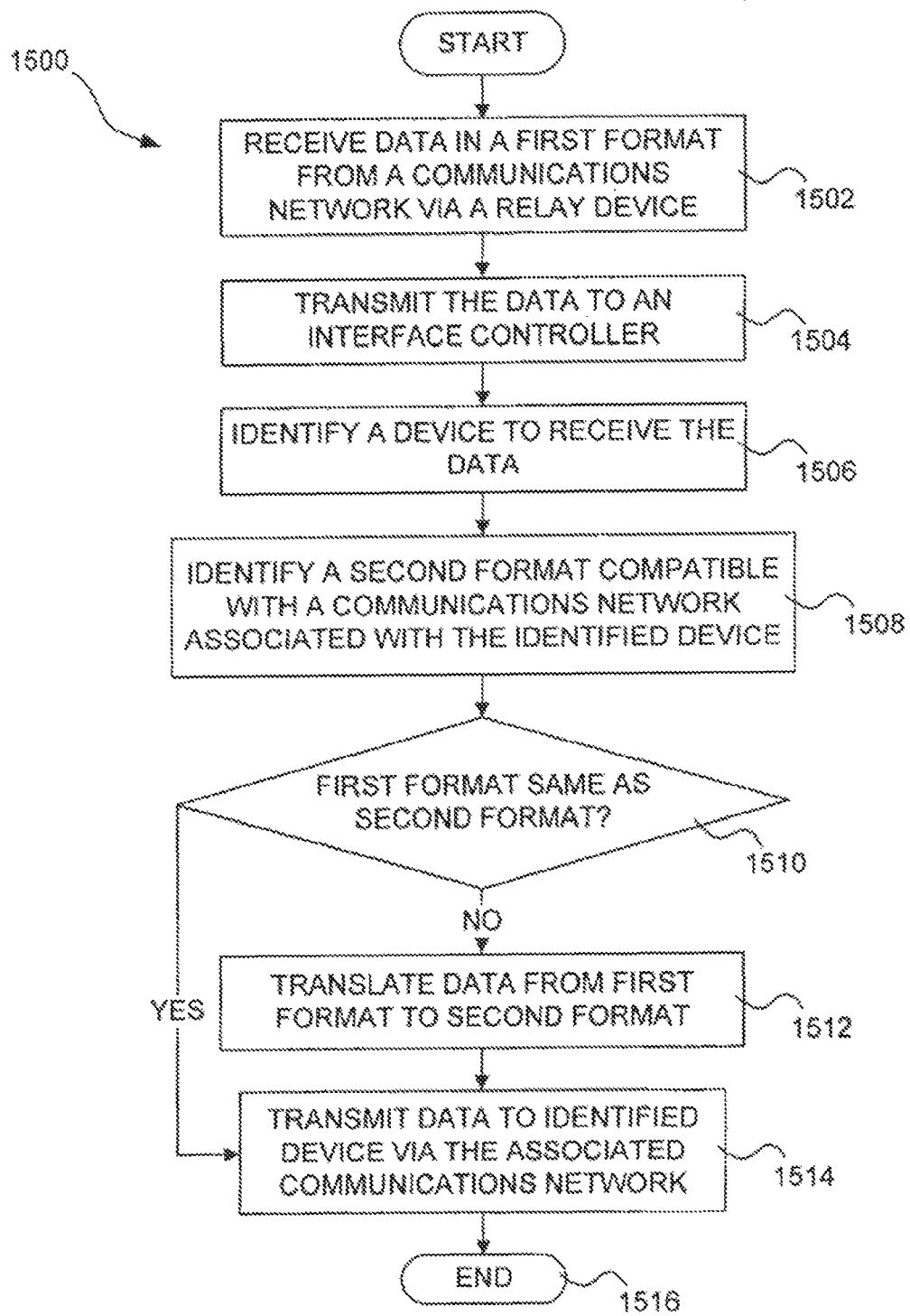
FIG. 15 is a flowchart showing an illustrative embodiment of the method and computer-readable medium associated with interfacing devices with communications networks.

Turning now to FIG. 15, an illustrative routine 1500 will be described illustrating a process for interfacing devices with communications networks. The routine 1500 begins at operation 1502, where the interface 1304 associated with the interface device 1302 receives data in a first format from the communications network 1320a via the relay device 1324. As discussed above, the interface 1304 may conform to a variety of wireless or wired network standards such that the interface may receive a variety of types of data via a variety of types of signals.

Once the data is received at the interface 1304, the routine 1500 continues to operation 1504, where the data is transmitted via the signaling line 1316 to the interface controller 1308. At operation 1506, the interface controller 1308 identifies at least one of the devices 1322a-1322n to receive the data from the communications network 1320a. As discussed above in view of FIG. 13, the interface controller 1308 may identify which of the devices 1322a-1322n should receive the data based on compatibility with the communications networks associated with each of the devices, a user profile stored on the interface device 1302, or instructions from the communications network 1320a that provided the data as to which of the devices should receive the data.

After the interface controller 1308 identifies at least one of the devices 1322a-1322n to receive the data, the routine 1500 proceeds to operation 1508, where the interface controller 1308 identifies a second format compatible with the communications network associated with the at least one device identified from the devices 1322a-1322n to receive the data. The routine 1500 then proceeds to operation 1510, where the interface controller 1308 determines whether the first format of the data is the same as the second format compatible with the communications network associated with the at least one device identified from the devices 1322a-1322n to receive the data. If the formats are the same, then the routine 1500 proceeds to operation 1514. If the formats are not the same, then the routine 1500 proceeds to operation 1512, where the interface controller 1308 translates the data from the first format to the second format compatible with the communications network associated with the at least one device identified from the devices 1322a-1322n to receive the data. The routine 1500 then proceeds to operation 1514.

At operation 1514, the interface controller 1308 transmits the data, whether translated or not, through at least one of the interfaces 1326, 1328, and 1330 associated with the at least one device identified from the devices 1322a-1322n to the device identified from the devices 1322a-1322n to receive the data via either a wireless or wired signaling connection. As discussed above with regard to FIG. 13, the interfaces 1326, 1328, and 1330 may be conformed to a variety of wired and wireless network standards so that the interfaces can transmit a variety of types of data via a variety of types of signals. From operation 1514, the routine 1500 continues to operation 1516, where it ends.

According to one embodiment, the mass storage 1388 of the interface device 1302 provides a repository for data from the external communications devices and communications networks, 1358a, 1358b, 1322a-1322n, 1320a, 1320b, 1356a, and 1356b, to which the interface device 1302 is attached. As discussed above, the mass storage 1388 may include disk, tape, or optical storage. It should be understood that the mass storage 1388 may be located within the interface device 1302 as shown in FIG. 13, may be a peripheral device externally connected to the interface device 1302, or may alternatively be located within the relay device 1324. In the alternative embodiment in which the mass storage 1388 is located within the relay device 1324, any functionality performed by the interface device 1302 as described herein may be performed by the relay device 1324 or may be performed by the interface device 1302 while accessing the mass storage 1388 located within the relay device. It should be understood that any type of data may be stored within mass storage 1388. According to one illustrative embodiment, the data stored within the mass storage 1388 is directory information, including names, addresses, and telephone numbers of persons and businesses. With directory information stored within the interface device 1302, the interface device may provide contact information as would be found in a typical telephone directory to any requesting device.

As a central repository for information, the interface device 1302 may receive and store personal data associated with at least one user. For example, the personal data may include credit card numbers, bank account numbers and related account information, personal access information for any device such as Personal Information Numbers (PINS) and passwords, or any other personal or confidential information. Because of the highly sensitive nature of this information, the interface device 1302 further includes a security agent for preventing unauthorized access to the information. The security agent may be any software or hardware mechanism for providing data security. As an example, the interface device 1302 may have a security program stored within the mass storage 1388 or non-volatile memory 1368 and executed by the logic within the processor 1374 that requires a user to provide authentication information prior to being allowed to access the information. The authentication information may be a user identification and corresponding password. This authentication information provided by the user is compared to authentication information stored within the mass storage 1388 or the non-volatile memory 1368. If a match is found, the user is granted access to the requested personal information. If a match is not found, the user is denied access to the requested personal information. Alternatively, the interface device 1302 may utilize biometrics such as fingerprint, retinal scan, facial structure recognition, DNA, and voice spectral analysis to grant or deny access to the personal data stored within the mass storage 1388.

The security agent may additionally or alternatively require authentication information associated with the device requesting access to the personal information stored within the mass storage 1388 prior to granting access. Rather than requiring a user to input a user identification and password, the security agent might compare identification information associated with the requesting device with a stored list of authorized device identifications to determine whether or not to grant access to the requested personal information. In this manner, access to sensitive information may be granted to anyone using an authorized device rather than basing access on a specific user. It should be appreciated that any number and type of security agents may be used to protect unauthorized access to the mass storage 1388. It should also be appreciated that different users and different devices may be granted access to various levels of personal information. For example, parents may have access to all personal information including all credit card numbers and other means for making electronic payments while their children are given access to only a designated credit card.

The interface controller 1308 may be programmed to auto-populate payment information fields on any Internet website with payment information corresponding to the access authorization level corresponding to the specific user or device making the purchase. If User A were making a purchase and attempted to input payment information, then the interface device 1302 would only allow User A to input the payment information stored within the interface device that corresponds to the user identification and password entered by User A when the purchase commenced or when User A initiated access to the network via the interface device 1302. By doing so, parents may exercise control over the purchases made on the Internet by their children.

According to another illustrative embodiment, the interface device 1302 is a central repository for data from a plurality of devices. Data is collected, stored, aggregated, and transmitted back to at least one device. As an example, each member of a family might keep a shopping list stored on their cellular telephone. The shopping lists are each stored on their respective telephones in a common format by a common client application stored on each cellular telephone. Logic within processor 1372 of the interface device 1302 receives and stores each list. Each family member may connect his or her cellular telephone to the interface device 1302 through a wired connection such as a USB cable or a FIREWIRE cable, or through a wireless connection such as a BLUETOOTH connection or using a wireless SIM card. Alternatively, each family member can establish a connection with the interface device 1302 using a cellular network, either through a relay device 1324 or directly with the interface device 1302.

Once connected to the interface device 1302, each family member will upload his or her shopping list to the interface device 1302 for storage. When it is time for a family member to go shopping, he or she will request a master shopping list. The request may be made via a user interface provided by the client application, or via an interface such as a button or GUI located on the interface device 1302. In response to the request, logic within the processor 1372 will aggregate each family member's list into a master list for the person doing the shopping. The master list is then transmitted to the requesting device, or transmitted to a designated printer for printing. In addition to aggregating the lists, it should be appreciated that the interface device 1302 may add to the data or may filter the data according to instructions stored within the user profile 1370 or according to the request for data. For example, a user may want the interface device 1302 to return data from only certain family members rather than all data from all family members. Additionally, a user may request only information stored since a selected date or during a selected time period.

The interface device 1302 may also provide this data collection, storage, and aggregation functionality in a manner that requires minimal user input such that the connection of the cellular telephone to the interface device 1302 and upload of data is transparent to the user. In this embodiment, the interface device 1302 detects each user's cellular telephone, establishes a communications link, and downloads data, all without any action required by the user. First, the interface device detects wireless devices as they enter within range of a wireless network. An example would be a network of BLUETOOTH devices. Each cellular telephone is configured such that they are detectable to the BLUETOOTH network when they move within range of the interface device 1302 or other device on the network. When the interface device 1302 detects a cellular telephone within range of the network, logic within the processor 1372 is configured to establish a connection to the telephone, request the shopping list or other applicable data, receive the data, and store the data in the mass storage 1388. In this embodiment, the master shopping list may be continuously updated on a designated cellular telephone or other device as the family members update their respective lists. It should be understood that while the example discussed herein described the embodiment in terms of shopping lists and cellular telephones, the embodiment is equally applicable to any scenario in which data is input into the interface device 1302 from multiple external sources or repeatedly input by the same device and then aggregated, filtered, or amended before sending the data to requesting device.

According to another illustrative embodiment, the interface 1330 of interface device 1302 includes a product identification input device. In other words, the interface 1330 reads codes associated with a product in order to input product identification information into the interface device 1302. Examples of product identification input devices include a Radio Frequency IDentity (RFID) proximity reader and an optical bar code reader. Following this example, device 1322n of FIG. 13 may be a plurality of products, each of which contains product identification information. Each product may be swiped in close proximity to the product identification input device in order to input the associated product identification information into the interface device 1302. This information is then stored in the mass storage 1388 of the interface device 1302 where it is to be used by the interface device in accordance with a user request or programmed action. In practice, a user might scan the bar codes of products into the bar code reader interface 1330 of the interface device 1302 when the user wants to place the product on a shopping list. So, as a user finishes the peanut butter, he might scan the bar code located on the peanut butter jar into the interface device 1302 in order to add peanut butter to the shopping list. The interface device 1302 then reads the bar code and stores information associated with the bar code in the master shopping list located in the mass storage 1388. As product information is scanned into the interface device 1302 for multiple products, the master shopping list is populated. The list may then be downloaded to a desired user device or printer as described above.

The interface device 1302 may further utilize data collection and aggregation features described above with the personal information securely stored within in order to make purchases from an Internet website or other network location or device associated with a network. Using the shopping list example discussed above, the processor 1372 may be programmed to make purchases from an Internet website according to a stored shopping list. The purchases or order may be programmed to be made on a specific date, at recurring intervals, or as initiated by a user. Using this feature, a user is able to easily consolidate purchase lists, add items to the lists, and be assured that purchases will be made in a timely manner with minimal user interaction.

The interface device 1302 may additionally contain billing information corresponding to information provided by the interface device to other devices. If a communications device accesses data from another device or a communications network via the interface device 1302, then the user associated with the requesting device may be billed for that service. The billing information contains costs associated with the services provided to each device or user. Costs may be based on the type of data being accessed, the quality of the data transmission to the requesting device, the amount of data being accessed, a contract or subscription associated with the user or requesting device, or any combination thereof. Users may subscribe to various amounts and types of data for a fixed periodic fee.

FIG. 16 illustrates a routine 1600 for exchanging data between a first device and a second device and billing for the service. The routine begins at operation 1602 where a request for data from a receiving device is received via an input of an interface device 1302. At operation 1604, a determination is made as to whether the receiving device is authorized to receive the data. This determination may be whether the receiving device identification matches a device identification on an authorized receiving device list or whether a user identification and password associated with the receiving device matches a user identification and password on an authorized users list.

If the receiving device is determined to not be authorized to receive the requested data, then the routine proceeds to operation 1606 where the receiving device is notified and the process ends at operation 1622. If, however, the receiving device is determined to be authorized to receive the requested data, then the routine proceeds to operation 1608 where billing information corresponding to the request for data is retrieved. It should be understood that the billing information may be retrieved at any time during the routine prior to billing the receiving device. The routine 1600 proceeds to operation 1610 where the requested data is received in a first format from a source device via an input of the interface device 1302. A second format compatible with the receiving device is identified at operation 1612. The data is translated to the second format at operation 1614 and transmitted to the receiving device at operation 1616. At operation 1618, the receiving device is billed for the data according to the billing information retrieved at operation 1608. Information associated with the transmission of data between the source device and the receiving device is stored in a log within the interface device 1302 at operation 1620. This information may include the time and data of the transfer, the status of the transfer, the type of data transferred, the amount of data transferred, the amount billed to the receiving device for the transfer, and any other information pertaining to the exchange. The routine 1600 ends at operation 1622.

It will be appreciated that exemplary embodiments provide methods, systems, apparatus, and computer-readable medium for interfacing devices with communications networks. Although the exemplary embodiments have been described in language specific to computer structural features, methodological acts and by computer readable media, it is to be understood that the exemplary embodiments defined in the appended claims are not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made without following the example embodiments and applications illustrated and described herein, and without departing from the true spirit and scope of the exemplary embodiments, which are set forth in the following claims.

What is claimed is:

1. An interface device for providing shared use of personal data between a first device and a second device, comprising:
 a repository for storing personal data associated with a first user;
 an input for receiving personal data from the first device;
 logic configured for
  receiving the personal data for electronically purchasing an item from the second device,
  determining whether a second user associated with the second device is authorized to use the personal data for purchasing the item, and
  transmitting authorization to the second device if the second user associated with the second device is authorized to use the personal data for electronically purchasing the item; and
 an output for transmitting the authorization to the second device.

2. The interface device of claim 1, wherein determining whether the second user associated with the request is authorized to use the personal data comprises receiving a device identification, comparing the received device identification with a stored device identification to determine whether the device identifications match, and if the device identifications match, authorizing the second device to use the personal data.

3. The interface device of claim 1, wherein determining whether the second user associated with the request is authorized to use the personal data comprises receiving a user identification and password associated with the user, comparing the received user identification and password with a stored user identification and password to determine if the user identifications and passwords match, and if the user identifications and passwords match, authorizing the second device to use the data.

4. The interface device of claim 1, wherein the personal data comprises financial data.

5. The interface device of claim 4, wherein the financial data comprises a credit card number.

6. The interface device of claim 1, wherein the logic is further configured for transmitting the personal data to a third device for storage and for transmitting the request to use the personal data to the third device.

7. A method for providing use of data stored at an interface device, comprising:
 receiving financial data from a first device at the interface device;
 receiving authentication information corresponding to authorized use of the financial data from the first device;
 storing the financial data and authentication information;
 receiving the financial data entered from a user of a second device;
 in response to receiving the financial data from the user of the second device, determining that the user of the second device is attempting to use the financial data via the interface device;

in response to determining that the user of the second device is attempting to use the financial data, requesting authentication information corresponding to the user from the second device;
receiving authentication information from the second device;
if the authentication information matches the stored authentication information from the first device, permitting use of the financial data; and
if the authentication information does not match the stored authentication information from the first device, preventing use of the financial data.

* * * * *